United States Patent
Wang

(10) Patent No.: US 7,861,113 B2
(45) Date of Patent: Dec. 28, 2010

(54) METHOD AND APPARATUS FOR OPERATING STORAGE CONTROLLER SYSTEM IN ELEVATED TEMPERATURE ENVIRONMENT

(75) Inventor: Yuanru Frank Wang, Broomfield, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 489 days.

(21) Appl. No.: 11/687,536

(22) Filed: Mar. 16, 2007

(65) Prior Publication Data

US 2008/0228959 A1 Sep. 18, 2008

(51) Int. Cl.
G06F 11/00 (2006.01)

(52) U.S. Cl. .......................................... 714/11; 713/320
(58) Field of Classification Search .................... 714/4, 714/11; 713/320
See application file for complete search history.

(56) References Cited

U.S. PATENT DOCUMENTS

| | | | |
|---|---|---|---|
| 5,247,671 A * | 9/1993 | Adkins et al. ................ | 718/103 |
| 5,490,059 A | 2/1996 | Mahalingaiah et al. | |
| 5,745,375 A * | 4/1998 | Reinhardt et al. ........... | 700/286 |
| 6,119,200 A * | 9/2000 | George ........................ | 711/106 |
| 6,425,092 B1* | 7/2002 | Evans et al. .................... | 714/13 |
| 6,625,750 B1* | 9/2003 | Duso et al. ..................... | 714/11 |
| 6,681,339 B2 | 1/2004 | McKean et al. | |
| 6,687,903 B1* | 2/2004 | Chalmer et al. ............. | 718/100 |
| 7,478,204 B2* | 1/2009 | McKenney et al. ......... | 711/151 |
| 2004/0088593 A1* | 5/2004 | Park ............................ | 713/322 |
| 2004/0260957 A1* | 12/2004 | Jeddeloh et al. ............. | 713/300 |
| 2005/0010715 A1* | 1/2005 | Davies et al. ................ | 711/100 |
| 2005/0091481 A1* | 4/2005 | Bogin et al. .................... | 713/1 |

(Continued)

FOREIGN PATENT DOCUMENTS

WO WO02/27451 A2 4/2002

(Continued)

OTHER PUBLICATIONS

Huang et al. "The Design of DEETm: a Framework for Dynamic Energy Efficiency and Temperature Management." *Journal of Instruction—Level Parallelism.* vol. 3., Published 2002. pp. 1-31 Department of Computer Science, University of Illinois at Urbana-Champaign.

(Continued)

*Primary Examiner*—Christopher S McCarthy
(74) *Attorney, Agent, or Firm*—Thomas J. Lavan; Elbert Alan Davis

(57) ABSTRACT

A storage controller that operates under elevated temperature conditions includes a memory, a memory controller, and a CPU that detects a temperature of the memory controller has exceeded a threshold while operating at a first frequency and responsively places the memory into self-refresh mode, reduces the memory controller frequency to a second frequency, and then takes the memory out of self-refresh mode. The clock frequency of a bus bridge or communications link circuit may also be reduced when their temperatures exceed a threshold. The bus bridge may deny access to requestors of access to the memory while the frequency is being reduced. Message transfers on a communications link between redundant storage controllers in a system may be suspended while the link frequency is being reduced. Finally, the system may fail over to one controller while the other controller reduces the frequencies and then fail back.

87 Claims, 11 Drawing Sheets

U.S. PATENT DOCUMENTS

| | | | |
|---|---|---|---|
| 2005/0207105 A1 | 9/2005 | Davies | |
| 2005/0246568 A1 | 11/2005 | Davies et al. | |
| 2005/0283561 A1 | 12/2005 | Lee et al. | |
| 2006/0136074 A1* | 6/2006 | Arai et al. | 700/2 |
| 2007/0033432 A1 | 2/2007 | Pecone et al. | |
| 2007/0140030 A1* | 6/2007 | Wyatt | 365/212 |

FOREIGN PATENT DOCUMENTS

| | | |
|---|---|---|
| WO | WO2006/019744 A2 | 2/2006 |

OTHER PUBLICATIONS

Pillai et al. "Real-Time Dynamic Voltage Scaling for Low-Power Embedded Operating Systems." Real-Time Computing Laboratory. Department of Electrical Engineering and Computer Science, The University of Michigan.

Pouwelse et al. "Dynamic Voltage Scaling on a Low-Power Microprocessor." Delft University of Technology, The Netherlands.

Shang et al. "Dynamic Voltage Scaling with Links for Power Optimization of Interconnection Networks." Department of Electrical Engineering, Princeton University, Princeton, NJ 08544.

Reese, Edmund A, et al. "A 4K x 8 Dynamic RAM with Self-Refresh." IEEE Journal of Solid-State Circuits. vol. SC-16, Oct. 31, 1981. pp. 479-487, XP002496859.

Huang et al. "The Design of DEETM: a Framework for Dynamic Energy Efficiency and Temperature Management." *Journal of Instruction—Level Parallelism*. vol. 3., Published 2002. pp. 1-31 Department of Computer Science, University of Illinois at Urbana-Champaign.

Pillai et al. "Real-Time Dynamic Voltage Scaling for Low-Power Embedded Operating Systems." Real-Time Computing Laboratory. Department of Electrical Engineering and Computer Science, The University of Michigan, 2001.

Pouwelse et al. "Dynamic Voltage Scaling on a Low-Power Microprocessor." Delft University of Technology, The Netherlands, 2001.

Shang et al. "Dynamic Voltage Scaling with Links for Power Optimization of Interconnection Networks." Department of Electrical Engineering, Princeton University, Princeton, NJ 08544, 2003.

* cited by examiner

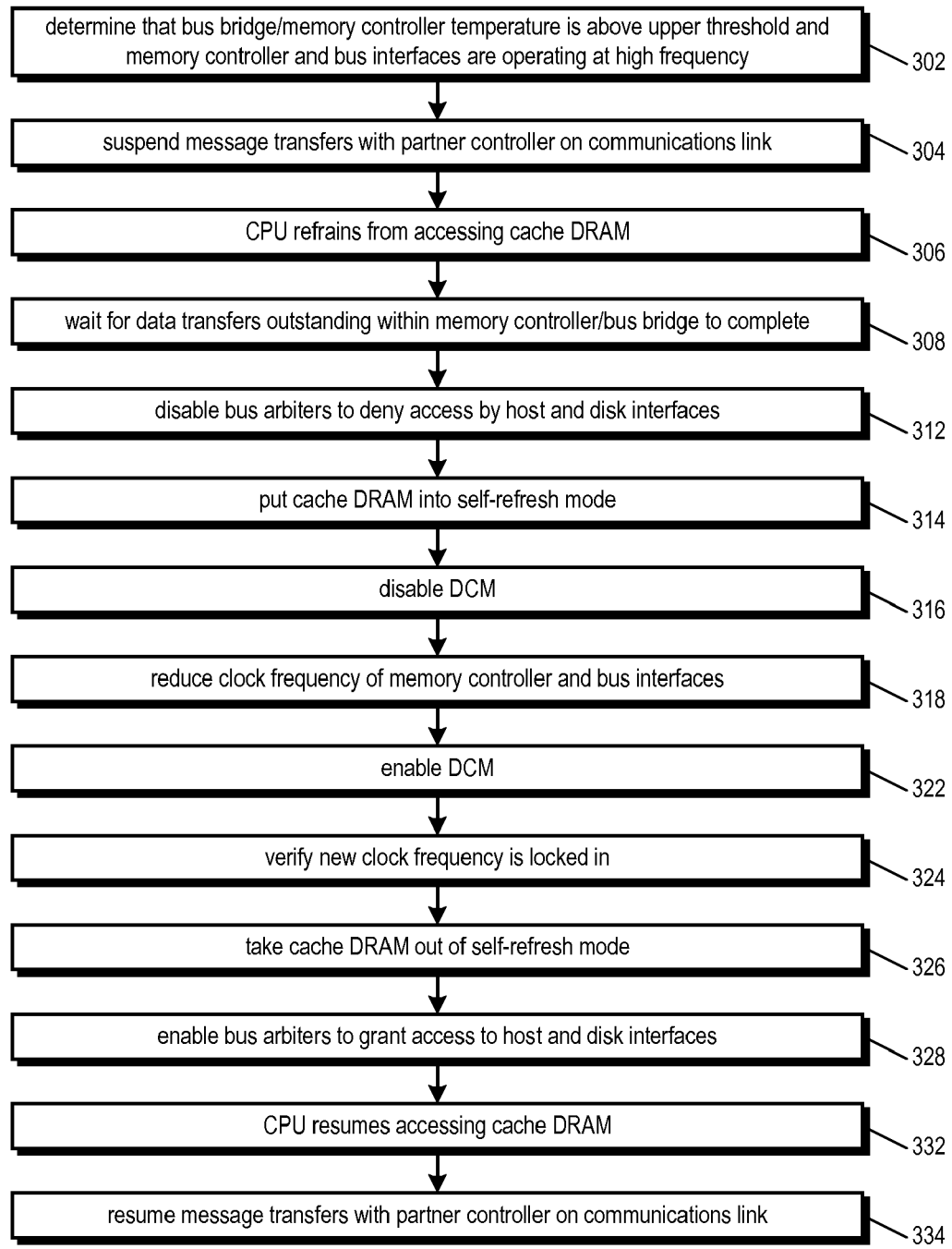

METHOD AND APPARATUS FOR OPERATING STORAGE CONTROLLER SYSTEM IN ELEVATED TEMPERATURE ENVIRONMENT

BACKGROUND OF THE INVENTION

FIELD OF THE INVENTION

The present invention relates in general to the field of high data availability storage controllers, and particularly to their use in elevated temperature environments.

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

Mass storage systems, such as RAID systems, include digital circuitry that is designed to operate within specific temperature ranges. If the temperature of the circuitry exceeds particular values, the circuits will cease to function properly, potentially causing data corruption or loss. Furthermore, as the density of storage systems increases, it becomes increasingly more difficult to cool them.

Current storage controller systems respond to elevated temperatures by first providing a warning to a system operator indicating the temperature has reached a warning threshold. If the system operator does not take necessary action to stop the temperature from rising—such as increasing air circulation around the system, lowering the room temperature, or reducing the amount of activity by the system—eventually the controller temperature will reach a second threshold near the temperature at which the circuits are known to fail. At this second temperature threshold, the storage controller will stop receiving I/O requests from the host computers in order to avoid data loss or corruption. In single storage controller environments, this will result in a loss of data availability. Even in a redundant storage controller environment, eventually both storage controllers may reach the second temperature threshold, with the same data unavailability consequence.

Data unavailability is undesirable and may be totally unacceptable in many mission critical applications, such as certain telecommunication industry applications. For example, the Network Equipment Building System (NEBS) standard imposes rigorous criteria for telecommunications equipment. One of the criteria is that the equipment ensures data availability within a relatively large temperature range present in telecommunications locations. What is needed is a solution to enable storage controllers to continue to operate and provide data availability under larger temperature ranges, such as the NEBS criteria, for example.

BRIEF SUMMARY OF INVENTION

In some computing environments, it is unacceptable for a storage system to reach a state where the data is unavailable, yet it is acceptable to make the data available at a reduced performance level. Advantageously, the present invention reduces the clock frequency of various storage controller circuits, according to various embodiments described herein, to enable the system to continue to provide data availability to the host computers even in elevated temperature environments, albeit at a possibly reduced performance level. Advantageously, the present invention reduces the clock frequencies without aborting I/O request servicing, therefore continuing to make the data on the connected disk drives available to the host computers, without incurring loss or corruption of the data.

In one aspect, the present invention provides a storage controller configured to operate under elevated temperature conditions. The storage controller includes a memory, configured to buffer data transferred between host computers and storage devices connected to the storage controller. The storage controller also includes a memory controller, configured to control the memory. The storage controller also includes a CPU, configured to detect that a temperature of the memory controller has exceeded a predetermined threshold while operating at a first frequency, place the memory into self-refresh mode after detecting that the temperature of the memory controller has exceeded the predetermined threshold, reduce the operating frequency of the memory controller to a second frequency after placing the memory into self-refresh mode, and take the memory out of self-refresh mode after reducing the operating frequency of the memory controller to the second frequency.

In another aspect, the present invention provides a storage controller configured to operate under elevated temperature conditions. The storage controller includes a memory, configured to buffer data transferred between host computers and storage devices connected to the storage controller. The storage controller also includes a memory controller, configured to control the memory. The storage controller also includes at least one interface controller, configured to request access to the memory. The storage controller also includes a bridge circuit, configured to bridge the at least one interface controller to the memory controller. The storage controller also includes a CPU, configured to detect that a temperature of the memory controller has exceeded a predetermined threshold while operating at a first frequency, control the bridge circuit to deny access to the memory by the at least one interface controller after detecting that the temperature of the memory controller has exceeded the predetermined threshold, reduce the operating frequency of the memory controller to a second frequency after denying access to the memory, and grant access to the memory by the at least one interface controller after reducing the operating frequency of the memory controller to the second frequency.

In another aspect, the present invention provides a storage controller configured to operate under elevated temperature conditions. The storage controller includes an interface controller, configured to interface the storage controller to host computers. The storage controller also includes a memory subsystem, configured to buffer data requested by the host computers, the data being received from disk drives controlled by the storage controller. The storage controller also includes a bus bridge, configured to bridge the interface controller and the memory subsystem. The storage controller also includes a CPU, configured to detect that a temperature of the bus bridge has exceeded a predetermined threshold while operating at a first frequency, program the bus bridge to deny access to the memory subsystem by the interface controller in response to detecting that the temperature of the bus bridge has exceeded the predetermined threshold, reduce the operating frequency of the bus bridge to a second frequency after denying access to the memory subsystem, and grant access to the memory by the interface controller after reducing the operating frequency of the bus bridge to the second frequency.

In another aspect, the present invention provides a redundant storage controller system configured to operate under elevated temperature conditions. The system controller includes first and second storage controllers, coupled by a serial communications link, each of the controllers having a integrated circuit configured to control communications on the link. The storage controllers are configured to detect that a temperature of at least one of the integrated circuits has exceeded a predetermined threshold while operating at a first frequency, suspend transfers of messages on the serial communications link in response to detecting that the temperature of the integrated circuit has exceeded the predetermined threshold, reduce the operating frequency of the integrated circuits to a second frequency after suspending transfers of messages on the serial communications link, and resume transfers of messages on the serial communications link after reducing the operating frequency of the integrated circuits to the second frequency.

In another aspect, the present invention provides a redundant storage controller system configured to operate under elevated temperature conditions. The system includes first and second storage controllers, each configured to control disk drives coupled thereto and to service I/O requests from hosts for data on the disk drives. The storage controllers are configured to detect that a temperature of the first storage controller has exceeded a predetermined threshold while operating at least a portion of the first storage controller at a first frequency, fail over from the first storage controller to the second storage controller to service the host I/O requests after detecting that the temperature of the first storage controller has exceeded the predetermined threshold, reduce the operating frequency of the portion of the first storage controller to a second frequency after failing over, and fail back to the first storage controller to service at least a portion of the host I/O requests after reducing the operating frequency of the portion of the first storage controller to the second frequency.

In another aspect, the present invention provides a method for allowing a storage controller to operate under elevated temperature conditions, the storage controller having a memory for buffering data transferred between host computers and storage devices connected to the storage controller, the storage controller further having a memory controller configured to control the memory. The method includes detecting that a temperature of the memory controller has exceeded a predetermined threshold while operating at a first frequency. The method also includes placing the memory into self-refresh mode, in response to detecting that the temperature of the memory controller has exceeded the predetermined threshold. The method also includes reducing the operating frequency of the memory controller to a second frequency, after placing the memory into self-refresh mode. The method also includes taking the memory out of self-refresh mode, after reducing the operating frequency of the memory controller to the second frequency.

In another aspect, the present invention provides a method for allowing a storage controller to operate under elevated temperature conditions, the storage controller having a memory for buffering data transferred between host computers and storage devices connected to the storage controller, the storage controller further having a memory controller configured to control the memory. The method includes detecting that a temperature of the memory controller has exceeded a predetermined threshold while operating at a first frequency. The method also includes denying access to the memory by one or more requestors requesting access thereto, in response to detecting that the temperature of the memory controller has exceeded the predetermined threshold. The method also includes reducing the operating frequency of the memory controller to a second frequency, after denying access to the memory. The method also includes granting access to the memory by the one or more requestors, after reducing the operating frequency of the memory controller to the second frequency.

In another aspect, the present invention provides a method for allowing a storage controller to operate under elevated temperature conditions, the storage controller having a bus bridge configured to bridge an interface controller and a memory subsystem, the interface controller configured to interface the storage controller to host computers, the memory subsystem configured to buffer data requested by the host computers. The method includes detecting that a temperature of the bus bridge has exceeded a predetermined threshold while operating at a first frequency. The method also includes denying access to the memory subsystem by the interface controller, in response to detecting that the temperature of the bus bridge has exceeded the predetermined threshold. The method also includes reducing the operating frequency of the bus bridge to a second frequency, after denying access to the memory subsystem. The method also includes granting access to the memory by the interface controller, after reducing the operating frequency of the bus bridge to the second frequency.

In another aspect, the present invention provides a method for allowing a redundant storage controller system to operate under elevated temperature conditions, the system having first and second storage controllers coupled by a serial communications link, each of the controllers having a integrated circuit configured to control communications on the link. The method includes detecting that a temperature of the integrated circuit of the first storage controller has exceeded a predetermined threshold while operating at a first frequency. The method also includes suspending transfers of messages on the serial communications link between the controllers, in response to detecting that the temperature of the integrated circuit has exceeded the predetermined threshold. The method also includes reducing the operating frequency of the integrated circuits to a second frequency, after suspending transfers of messages on the serial communications link. The method also includes resuming transfers of messages on the serial communications link between the controllers, after reducing the operating frequency of the integrated circuits to the second frequency.

In another aspect, the present invention provides a method for allowing a redundant storage controller system to operate under elevated temperature conditions, the system having first and second storage controllers each configured to control disk drives coupled thereto and to service I/O requests from hosts for data on the disk drives. The method includes detecting that a temperature of the first storage controller has exceeded a predetermined threshold while operating at least a portion of the first storage controller at a first frequency. The method also includes failing over from the first storage controller to the second storage controller to service the host I/O requests, after detecting that the temperature of the first storage controller has exceeded the predetermined threshold. The method also includes reducing the operating frequency of the portion of the first storage controller to a second frequency, after failing over. The method also includes failing back to the first storage controller to service at least a portion of the host I/O requests, after reducing the operating frequency of the portion of the first storage controller to the second frequency.

BRIEF DESCRIPTION OF THE DRAWINGS

FIG. 3 is a flow diagram illustrating operation of the RAID controller of FIG. 1 to reduce the clock frequency of the memory controller and/or bus interfaces in order to facilitate the RAID controller remaining operational under elevated temperatures without disrupting the processing of I/O requests from the host computers and without losing or corrupting data according to the present invention.

DETAILED DESCRIPTION

The amount of heat generated by the digital circuits of a storage controller is a function of the frequency at which the various circuits operate, among other factors. The amount of heat generated directly affects the operating temperatures of the circuits. Thus, one means of reducing the temperature of a storage controller is to reduce the operating frequency of the various circuits according to the methods described herein. Advantageously, the embodiments reduce the frequency of storage controller circuits while the storage controllers continue to service I/O requests from host computers and therefore continue to make the data on the connected disk drives available to the host computers without incurring loss or corruption of the data while reducing the clock frequencies. Additionally, reducing the clock frequencies of the circuits of the storage controllers may also advantageously enable the system to continue to operate in an elevated temperature environment in which the system could not otherwise continue to operate if the circuits were operating at the normal higher clock frequency. This is due to the fact that, generally speaking, if a digital circuit will fail at a temperature while operating at a first frequency, it will not fail at the same temperature while operating at second frequency if the second frequency is sufficiently lower than the first frequency.

Figure 1:
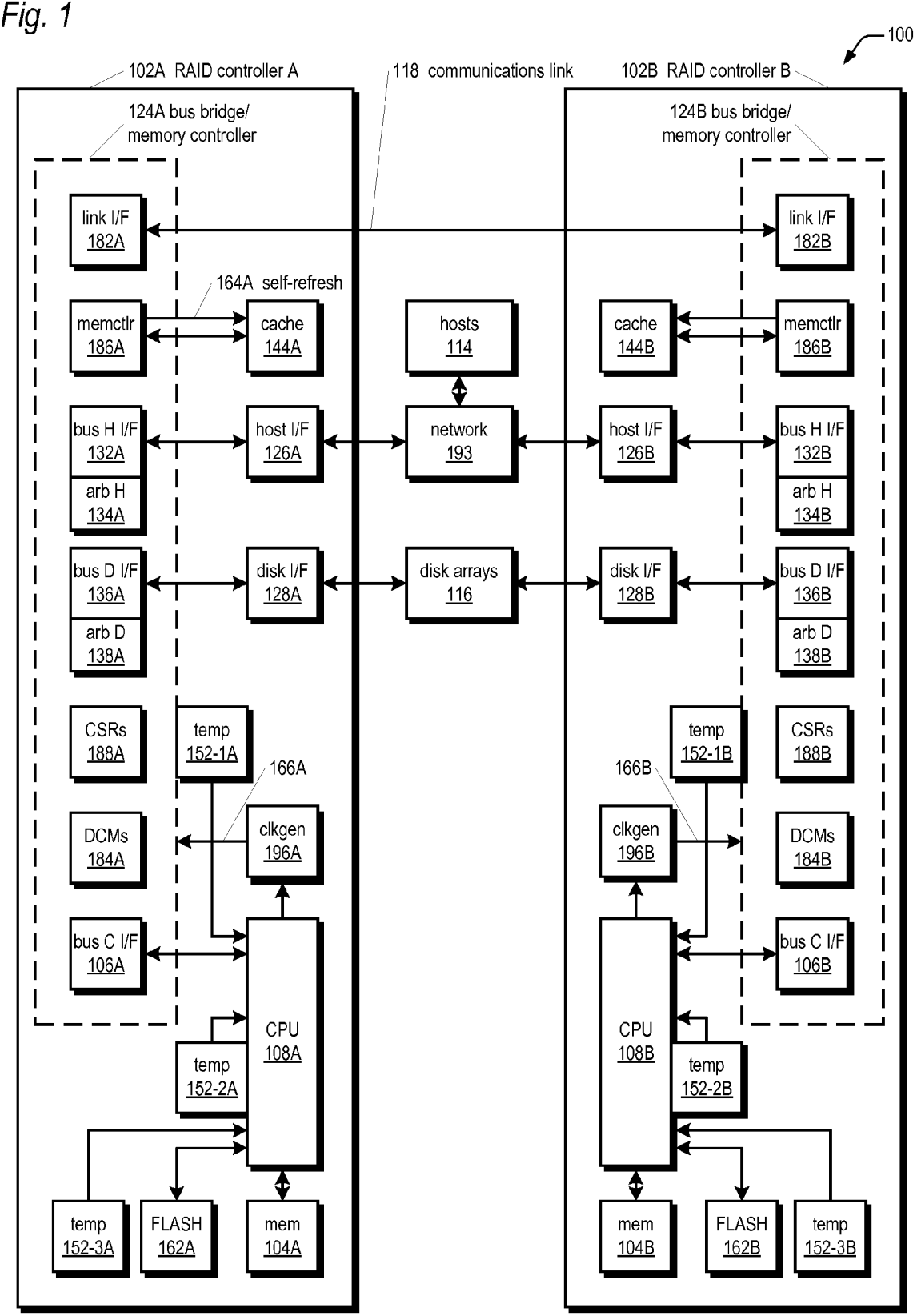
FIG. 1 is a block diagram of a redundant storage controller system capable of operating at elevated temperatures according to the present invention.

Referring now to FIG. 1, a block diagram of a redundant storage controller system 100 capable of operating at elevated temperatures according to the present invention is shown. The system 100 includes two RAID controllers 102. The two RAID controllers 102 are denoted individually RAID controller A 102A and RAID controller B 102B, generically as RAID controller 102, and collectively as RAID controllers 102. The RAID controllers 102 are also referred to herein as storage controllers 102. The two RAID controllers 102A and 102B are effectively symmetrical, particularly in the sense that either RAID controller 102 can detect an elevated temperature of one of its circuits and reduce the operating frequency thereof. Furthermore, either RAID controller 102 can detect the elevated temperature and cooperate with the other RAID controller 102 to effectively reduce the operating frequency of a circuit in a manner to continue to provide data availability to host computers requesting data from a set of common storage devices controlled by the RAID controllers 102. Finally, either RAID controller 102 can detect the elevated temperature of a circuit controlling a communications link between the RAID controllers 102 and cooperate with the other RAID controller 102 to effectively reduce the operating frequency of the circuit in a manner to continue to provide data availability.

Each RAID controller 102 includes a CPU 108, a memory 104 coupled to the CPU 108, a disk interface 128 for interfacing to disk arrays 116 comprising a plurality of physical storage devices such as disk drives, a host interface 126 for interfacing with host computers 114 via a network 193, and a cache memory 144 for caching data transferred between the disk arrays 116 and the hosts 114. Each RAID controller 102 also includes a bus bridge/memory controller 124, coupled to the CPU 108, disk interface 128, host interface 126, and cache memory 144. The bus bridge/memory controller 124 includes a link interface 182 for interfacing to a communications link 118. The bus bridge/memory controller 124 also includes a memory controller 186 for controlling the cache memory 144. The bus bridge/memory controller 124 also includes control and status registers (CSRs) 188, described in more detail with respect to FIG. 2, which are programmable by the CPU 108 for controlling the bus bridge/memory controller 124. The bus bridge/memory controller 124 also includes digital clock modules (denoted DCMs 184 in FIG. 1) that receive the clock signals 166 from the clock generator 196. In one embodiment, the bus bridge/memory controller 124 includes three DCMs 184: one for the memory controller 186, one for the bus interfaces 132/136, and one for the link interface 182. The DCMs 184 include clock multipliers that multiply the received clock signals 166 and provide the multiplied clock signals to the respective memory controller 186, bus interfaces 132/136, and link interface 182. Additionally, the DCMs 184 may be disabled such that they stop providing their output clock signals to their respective circuits while the clock generator 196 is being reprogrammed to generate new clock frequencies, as described below.

The RAID controllers 102 are coupled to one another by a communications link 118. The CPU 108 programs a DMA controller in the bus bridge/memory controller 124 to transfer messages on the PCI-Express link 118 to the partner RAID controller 102. Preferably, the link interface 182 includes a PCI-Express interface 182 for interfacing to a PCI-Express link 118. The PCI-Express link 118 is an efficient high-speed serial link designed to transfer data between components within a computer system as described in the PCI Express Base Specification Revision 1.0a, Apr. 15, 2003. The PCI Express specification is managed and disseminated through the PCI Special Interest Group (SIG) found at www.pcisig.com. PCI-Express is a serial architecture that replaces the parallel bus implementations of the PCI and PCI-X bus specification to provide platforms with greater performance, while using a much lower pin count. A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com. In one embodiment, the RAID controllers 102 are hot-pluggable into the backplane. Other embodiments are contemplated, including but not limited to, a FibreChannel link or Serial Attached SCSI (SAS) link. In one embodiment, the communications link 118 comprises signal traces on a backplane or mid-plane of a chassis into which the RAID controllers 102 plug.

The CPU 108, or processor 108, or CPU complex 108, may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the CPU 108 comprises an Intel Mobile Sempron processor in which software execution on the CPU 108 can adjust the operating clock frequency and voltage of the CPU 108. In one embodiment, the CPU complex 108 comprises a Transmeta TM8800 processor that includes an integrated North Bridge and an ALi M1563S South Bridge. In another embodiment, the CPU 108 comprises an AMD Elan SC-520 microcontroller. In another embodiment, the CPU 108 comprises an Intel Celeron M processor and an MCH and ICH.

In one embodiment, the CPU memory 104 comprises a double-data-rate (DDR) RAM, and the CPU 108 is coupled to the DDR RAM 104 via a DDR bus, which may be presented by a North Bridge or MCH, for example. In one embodiment, the CPU 108 and bus bridge/memory controller 124 are coupled by a local bus, such as a PCI, PCI-X, PCI-Express, or other PCI family local bus. The bus bridge/memory controller 124 includes a bus interface circuit (referred to in FIG. 1 as bus C I/F 106) for interfacing to the local bus that couples the bus bridge/memory controller 124 to the CPU 108. In one embodiment, the cache memory 144 comprises a DDR RAM coupled to the bus bridge 124 via a DDR bus. The bus bridge/memory controller 124 includes a memory controller circuit (referred to in FIG. 1 as memctlr 186) for interfacing to the memory bus that couples the memory controller 186 to the cache memory 144.

In one embodiment, the host interface 126 and disk interface 128 comprise PCI-X devices coupled to the bus bridge/memory controller 124 via respective PCI-X buses. The bus bridge/memory controller 124 includes a bus interface circuit (referred to in FIG. 1 as bus H I/F 132) for interfacing to the local bus that couples the bus bridge/memory controller 124 to the host interface 126. The bus bridge/memory controller 124 includes a bus arbiter (referred to in FIG. 1 as arb H 134) that grants access to devices requesting control of the local bus coupling the bus bridge/memory controller 124 to the host interface 126 to read or write other devices coupled to the bus bridge/memory controller 124, such as the cache memory 144. The bus bridge/memory controller 124 includes a bus interface circuit (referred to in FIG. 1 as bus D I/F 136) for interfacing to the local bus that couples the bus bridge/memory controller 124 to the disk interface 128. The bus bridge/memory controller 124 includes a bus arbiter (referred to in FIG. 1 as arb D 138) that grants access to devices requesting control of the local bus coupling the bus bridge/memory controller 124 to the disk interface 128 to read or write other devices coupled to the bus bridge/memory controller 124, such as the cache memory 144. In one embodiment, the memory controller 186, communications link interface 182, and bus interfaces 132/136/106 are all included in a single integrated circuit, as shown in FIG. 1. In one embodiment, the single integrated circuit comprises a field-programmable gate array (FPGA), such as a Xilinx Virtex-II Pro FPGA. However, other embodiments are contemplated in which some or each of the memory controller 186, communications link interface 182, and bus interfaces 132/136/106 are included in different integrated circuits.

The cache memory 144 is used to buffer and cache user data as it is transferred between host computers 114 and disk arrays 116 via the host interface 126 and disk interface 128, respectively. In one embodiment, the cache memory 144 is backed up by a rechargeable energy source in case of a loss of main power. In one embodiment, the rechargeable energy source is a battery. In one embodiment, the rechargeable energy source is a super-capacitor. A FLASH memory 162, or other non-volatile memory, is also coupled to the CPU 108 and initially stores the program instructions executed by the CPU 108 which are copied from the FLASH memory 162 to the CPU memory 104 during boot up of the RAID controller 102.

The disk interface 128 interfaces the RAID controller 102 to the disk arrays 116, which comprise disk drives or other mass storage devices, including but not limited to, tape drives, solid-state disks (SSD), and optical storage devices, such as CDROM or DVD drives. The disk arrays 116 store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 102 reads and writes data from or to the disk arrays 116 in response to I/O requests received from host computers 114. The disk interface 128 is coupled to the bus bridge 124 via a local bus, such as a PCI, PCI-X, or other PCI family local bus.

The host interface 126 interfaces the RAID controller 102 with the host computers 114. In one embodiment, the RAID controller 102 is a local bus-based controller, such as a controller that plugs into, or is integrated into, a local I/O bus of the host computer system 114, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the RAID controller 102 is a standalone controller in a separate enclosure from the host computers 114 that issue I/O requests to the RAID controller 102. For example, the RAID controller 102 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like. The host interface 126 is coupled to the bus bridge 124 via a local bus, such as a PCI, PCI-X, or other PCI family local bus.

The CPU 108, host interface 126, and disk interface 128, read and write data from and to the cache memory 144 via the bus bridge 124. The CPU 108 fetches and executes instructions of programs stored in the CPU memory 104 that control the transfer of data between the disk arrays 116 and the hosts 114. The CPU 108 receives commands from the hosts 114 to transfer data to or from the disk arrays 116. In response, the CPU 108 issues commands to the disk interface 128 to accomplish data transfers with the disk arrays 116. Additionally, the CPU 108 provides command completions to the hosts 114 via the host interface 126. The CPU 108 may also perform storage controller functions such as RAID control, logical block translation, buffer management, and data caching.

The RAID controller 102 includes three temperature sensors, referred to collectively as temperature sensors 152. A first temperature sensor 152-1 senses the temperature of the bus bridge/memory controller 124 and provides the temperature to the CPU 108. A second temperature sensor 152-2 senses the temperature of the CPU 108 and provides the temperature to the CPU 108. A third temperature sensor 152-3 senses the temperature of the RAID controller 102 circuit board and provides the temperature to the CPU 108.

The RAID controller 102 also includes a clock generator 196 coupled to the CPU 108 and bus bridge/memory controller 124. The clock generator 196 generates a plurality of clock signals 166 for use by the RAID controller 102. In one embodiment, the clock generator 196 generates a first clock signal 166 that controls the memory controller 186 and that the memory controller 186 uses to generate a clock signal on the bus coupling the memory controller 186 and the cache memory 144; a second clock signal 166 that controls the PCI-Express link interface 182 and that the PCI-Express link interface 182 uses to generate signals on the PCI-Express link 118; and a third clock signal 166 that controls the host PCI-X interface 132 and the disk PCI-X interface 136 and that the host PCI-X interface 132 and the disk PCI-X interface 136 use to generate a clock signal on the buses coupling the host interface 126 to the host PCI-X interface 132 and the disk interface 128 to the disk PCI-X interface 136, respectively. The CPU 108 programs the clock generator 196 to generate the desired frequency on each of the clock output signals 166, and in particular, to raise and lower the clock frequency of different circuits in response to detecting that the temperatures of the circuits have reached predetermined thresholds, as described below.

Figure 2A:
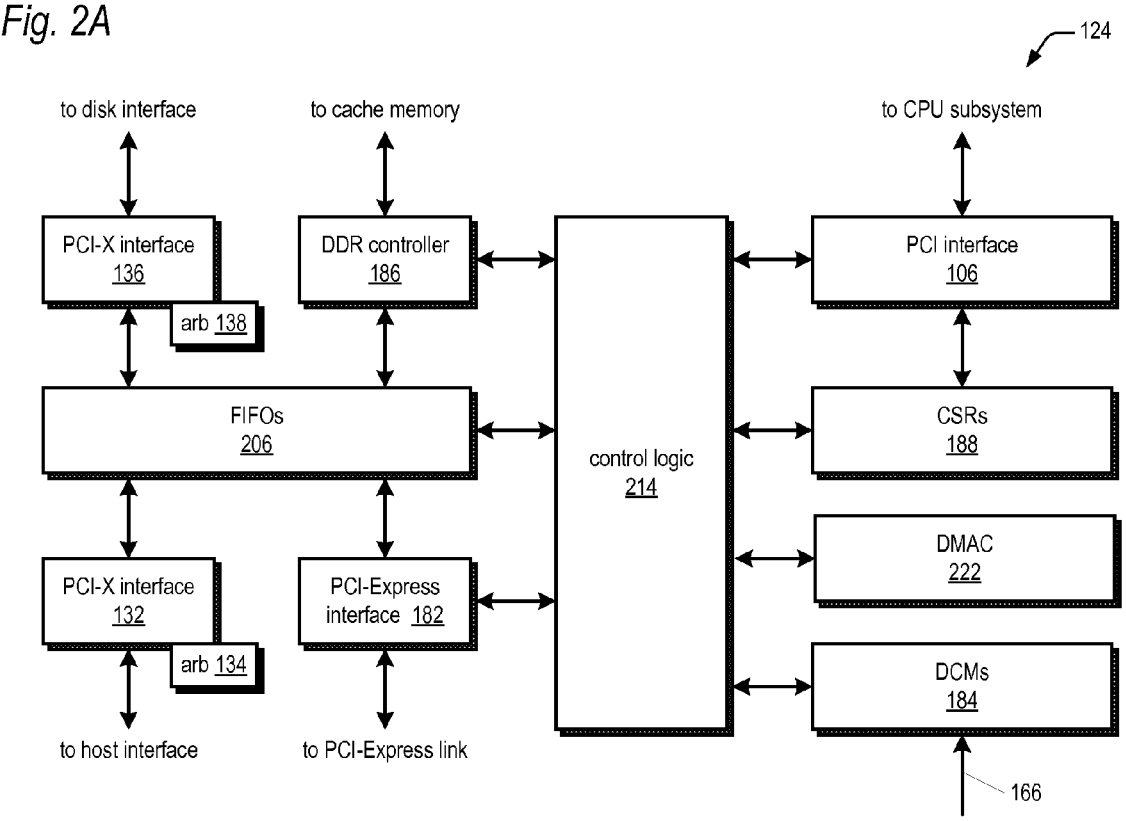
FIG. 2A is a block diagram illustrating in more detail the bus bridge/memory controller of FIG. 1 according to the present invention.

Referring now to FIG. 2A, a block diagram illustrating in more detail the bus bridge/memory controller 124 of FIG. 1 according to the present invention is shown. The bus bridge/memory controller 124 includes control logic 214 for controlling various portions of the bus bridge/memory controller 124.

The bus bridge/memory controller 124 also includes the local bus interface 136 of FIG. 1 (such as a PCI-X interface) for interfacing the bus bridge/memory controller 124 to the disk interface 128; the local bus interface 132 of FIG. 1 (such as a PCI-X interface) for interfacing the bus bridge/memory controller 124 to the host interface 126; the memory controller 186 of FIG. 1 (such as a DDR SDRAM controller) for interfacing the bus bridge/memory controller 124 to the cache memory 144; and the PCI-Express interface 182 of FIG. 1 for interfacing the bus bridge/memory controller 124 to the PCI-Express link 118. The local bus interfaces 136 and 138, memory controller 186, and PCI-Express interface 182 are all coupled to the control logic 214 and are also coupled to buffers 206 (such as first-in-first-out (FIFO) buffers) that buffer data transfers between the various interfaces and provide parallel high-speed data paths therebetween. The bus bridge/memory controller 124 also includes the local bus interface 106 of FIG. 1, such as a PCI or PCI-X interface, coupled to the control logic 214, for interfacing the bus bridge/memory controller 124 to the CPU 108. The CPU 108 accesses the cache memory 144, disk interface 128, and host interface 126 via the PCI interface 106. The CSRs 188 of FIG. 1 are coupled to the control logic 214 and to the PCI interface 106. The DCMs 184 of FIG. 1 are coupled to the control logic 214.

The PCI-Express interface 182 performs the PCI-Express protocol on the PCI-Express link 118, including transmitting and receiving PCI-Express packets, such as PCI-Express transaction layer packets (TLPs) and data link layer packets (DLLPs), and in particular memory read and write request TLPs. In one embodiment, the PCI-Express interface 182 substantially conforms to relevant portions of the PCI Express Base Specification Revision 1.0a, Apr. 15, 2003. The control logic 214 is coupled to a direct memory access controller (DMAC) 222 that is programmable by the CPU 108 to transfer messages from the cache memory 144 to the partner RAID controller 102 via the PCI-Express link 118.

Figure 2B:
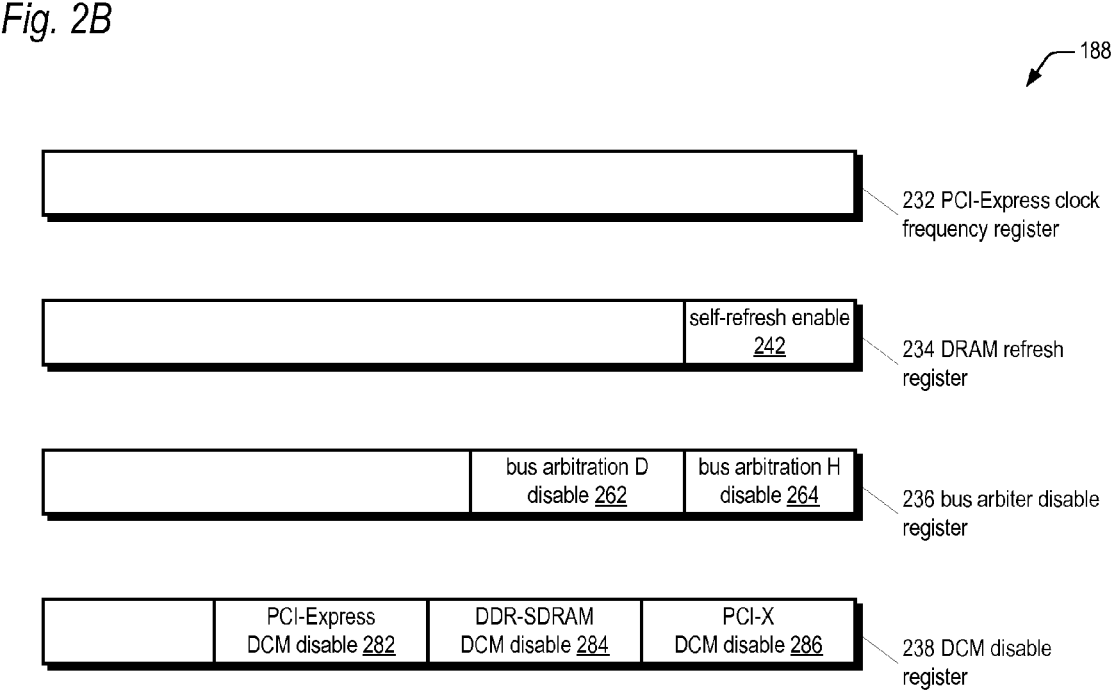
FIG. 2B is a block diagram illustrating in more detail some of the CSRs of FIG. 1 according to the present invention.

Referring now to FIG. 2B, a block diagram illustrating in more detail some of the CSRs 188 of FIG. 1 according to the present invention is shown.

The CSRs 188 include a PCI-Express clock frequency register 232. The CPU 108 programs the PCI-Express clock frequency register 232 to set the clock frequency at which the PCI-Express interface 182 transmits messages on the PCI-Express link 118 to the partner RAID controller 102.

The CSRs 188 also include a DRAM refresh register 234 that includes a self-refresh enable bit 242. The CPU 108 sets the self-refresh enable bit 242 to place the cache memory 144 into self-refresh mode and clears the self-refresh enable bit 242 to take the cache memory 144 out of self-refresh mode.

The CSRs 188 also include a bus arbiter disable register 236 that includes a bus arbitration D disable bit 262 and a bus arbitration H disable bit 264. The CPU 108 sets the bus arbitration D disable bit 262 to disable the bus arbiter 134 from granting the host interface 126 access to the cache memory 144 and clears the bus arbitration D disable bit 262 to enable the bus arbiter 134 to grant the host interface 126 access to the cache memory 144. Similarly, the CPU 108 sets the bus arbitration H disable bit 264 to disable the bus arbiter 138 from granting the disk interface 128 access to the cache memory 144 and clears the bus arbitration H disable bit 264 to enable the bus arbiter 138 to grant the disk interface 128 access to the cache memory 144.

The CSRs 188 also include a DCM disable register 238 that includes a PCI-Express DCM disable bit 282, a DDR-SDRAM DCM disable bit 284, and a PCI-X DCM disable bit 286. The CPU 108 sets the PCI-Express DCM disable bit 282 to disable the clock signals to the PCI-Express interface 182. The CPU 108 sets the DDR-SDRAM DCM disable bit 284 to disable the clock signals to the memory controller 186. The CPU 108 sets the PCI-X DCM disable bit 286 to disable the clock signals to the PCI-X interfaces 132 and 136.

Referring now to FIG. 3, a flow diagram illustrating operation of the RAID controller 102 of FIG. 1 to reduce the clock frequency of the memory controller 186 and/or bus interfaces 132/136 in order to facilitate the RAID controller 102 remaining operational under elevated temperatures without disrupting the processing of I/O requests from the host computers 114 and without losing or corrupting data according to the present invention is shown. Flow begins at block 302.

At block 302, the CPU 108 samples the temperatures from the temperature sensors 152 and determines that the temperature of the bus bridge/memory controller 124 is above a predetermined upper threshold and that the memory controller 186 and bus interfaces 132/136 are operating at a high frequency, i.e., at a frequency that is higher than the lowest frequency in the set of possible frequencies that the code running on the CPU 108 is configured to set the memory controller 186 or bus interfaces 132/136. The set of possible frequencies is at least two frequencies for the memory controller 186 and at least two frequencies for the bus interfaces 132/136; however, embodiments are contemplated in which the sets include more then two frequencies in order to allow more fine-grained frequency reduction and the accompanying effect on heat generation by the bus bridge/memory controller 124. In these embodiments, the predetermined threshold temperatures that trigger a frequency reduction may be monotonically increasing in correspondence with each reduction in operating frequency. In one embodiment, the CPU 108 determines from the bus bridge/memory controller 124 temperature sensor 152-1 that the temperature is above the predetermined threshold. In another embodiment, the CPU 108 determines from the general circuit board temperature sensor 152-3 that the temperature is above the predetermined threshold, such as in an embodiment in which the RAID controller 102 includes the circuit board temperature sensor 152-3 but does not include a distinct temperature sensor for the bus bridge/memory controller 124. That is, the determination that a frequency adjustment is required may be made in response to temperature samples of various sources. Flow proceeds to block 304.

At block 304, the two RAID controllers 102 suspend message transfers on the communications link 118. Advantageously, suspending message transfers on the communications link 118 prevents the link interface 182 from accessing the cache memory 144 to avoid data loss or corruption while the frequencies of the clocks to the memory controller 186 and bus interfaces 132/136 are being reduced. In one embodiment, the RAID controllers 102 suspend message transfers on the communications link 118 by communicating via an alternate communications path, such as via the communication path by which the RAID controllers 102 communicate with the disk array 116, such as via a FibreChannel or SAS fabric, as described with respect to FIG. 4. In another embodiment, the RAID controllers 102 suspend message transfers on the communications link 118 by having one RAID controller 102 kill the partner RAID controller 102, such as by holding the partner RAID controller 102 in reset, so that the killed RAID controller 102 does not communicate on the communications link 118 for a while, as described with respect to FIG. 5. It is noted that the steps described in FIG. 3 to reduce the frequency of the RAID controller 102 to enable it to operate in an elevated temperature environment may be performed in a non-redundant system having only a single RAID controller 102; in this system, the steps at blocks 304 and 334 are not performed. Flow proceeds to block 306.

At block 306, the CPU 108 commences refraining from accessing the cache memory 144. That is, the CPU 108 refrains from reading or writing the cache memory 144 or causing other devices (such as the DMAC 222, disk interface 128, or host interface 126) to read or write the cache memory 144. In one embodiment, the steps of FIG. 3 performed by the CPU 108 are performed in a non-preemptable section of code to avoid accesses to the cache memory 144 while the clock frequencies are reduced. Advantageously, the steps are performed in real time and the clock frequencies are reduced as described in FIG. 3 without aborting requests from the host computers 114 or disk arrays 116. Flow proceeds to block 308.

At block 308, the CPU 108 waits for all data transfers outstanding within the bus bridge/memory controller 124 to drain, or complete. In one embodiment, the CPU 108 spin waits in a code loop for an amount of time that is greater than the maximum amount of time for any outstanding transfers within the bus bridge/memory controller 124 to drain to or from the cache memory 144, which is a function of the bus width and speed and the worst case size of the outstanding transfers. In one embodiment, the maximum amount of wait time is on the order of microseconds. Flow proceeds to block 312.

At block 312, the CPU 108 sets the bus arbitration D disable bit 262 and the bus arbitration H disable bit 264 of the bus arbiter disable register 236 of FIG. 2B in order to disable the arbiters 134/138 so that the bus interfaces 132/136 will not grant ownership of their respective buses in order to deny access to the cache memory 144 by the host interface 126 and the disk interface 128. In one embodiment, the CPU 108 ensures that the amount of time the arbiters 134/138 are disabled is less than an amount of time beyond which the disk interface 128 or host interface 126 would generate an unrecoverable error if denied ownership of the respective bus. Advantageously, in the mean time, the host interface 126 queues up any I/O requests received from the host computers 114 and continues retrying to obtain ownership of the bus, and the disk interface 128 queues up any requests received from the disk arrays 116 and continues retrying to obtain ownership of the bus. Flow proceeds to block 314.

At block 314, the CPU 108 places the cache memory 144 into self-refresh mode by setting the self-refresh enable bit 242 in the DRAM refresh register 234 of FIG. 2B. Flow proceeds to block 316.

At block 316, the CPU 108 disables the DCMs 184 by setting the DDR-SDRAM clock module disable bit 284 and the PCI-X clock module disable bit 286 to stop the clocks to the memory controller 186 and bus interfaces 132/136. Flow proceeds to block 318.

At block 318, the CPU 108 programs the clock generator 196 to reduce the frequency of the clocks 166 generated by the clock generator 196 for the memory controller 186 and the bus interfaces 132/136. In one embodiment, the reduced clock frequency is a frequency at which the memory controller 186 and the bus interfaces 132/136 can continue to operate even at an upper operating temperature value of the NEBS criteria. In one embodiment, the clock generator 196 is an ICS308 serial programmable quad PLL versaclock synthesizer provided by Integrated Circuit Systems, and the CPU 108 writes a predetermined sequence of bits to the clock generator 196 to program the desired frequency into the clock generator 196. In one embodiment, the CPU 108 may only reduce the clock frequency of the memory controller 186 or the bus interfaces 132/136, but not both, even though the CPU 108 determines at block 302 that both are operating at a high frequency. For example, the CPU 108 may determine that the rate at which the temperature of the bus bridge/memory controller 124 is rising is small enough that the frequency of only one of the clocks 166 needs to be reduced in order to accomplish the necessary heat reduction. Furthermore, as discussed above, embodiments are contemplated in which the memory controller 186 and bus interfaces 132/136 are included in two or more distinct integrated circuits and thus their temperatures may be separately sampled. In such embodiments, the CPU 108 may reduce the frequency of the clock 166 of the distinct circuits individually or in combination. In one embodiment, the bus bridge/memory controller 124 may also include control registers that the CPU 108 may program to reduce the frequency of the clocks provided to the memory controller 186 and bus interfaces 132/136. Still further, embodiments are contemplated in which the clock generation circuitry is internal to the bus bridge/memory controller 124, rather than the RAID controller 102 having a discrete clock generator 196. Flow proceeds to block 322.

At block 322, the CPU 108 enables the DCMs 184 by clearing the DDR-SDRAM clock module disable bit 284 and the PCI-X clock module disable bit 286 to provide the clocks to the memory controller 186 and bus interfaces 132/136. Flow proceeds to block 324.

At block 324, the CPU 108 verifies that the new clock frequency programmed at block 318 is locked in. In one embodiment, the bus bridge/memory controller 124 includes three phase-locked loop (PLL) circuits that are controlled by the three clock signals 166 generated by the clock generator 196 to the memory controller 186, bus interfaces 132/136, and link interface 182. The CPU 108 verifies that the PLLs are locked in before proceeding. Flow proceeds to block 326.

At block 326, the CPU 108 takes the cache memory 144 out of self-refresh mode by clearing the self-refresh enable bit 242 in the DRAM refresh register 234. Flow proceeds to block 328.

At block 328, the CPU 108 clears the bus arbitration D disable bit 262 and the bus arbitration H disable bit 264 of the bus arbiter disable register 236 in order to enable the arbiters 134/138 so that the bus interfaces 132/136 can grant ownership of their respective buses in order to enable access to the cache memory 144 by the host interface 126 and the disk interface 128. If any outstanding requests are queued in the disk interface 128 or host interface 126, they may now be processed when the bus interfaces 132/136 grant ownership of their respective buses to the host interface 126 and the disk interface 128. Flow proceeds to block 332.

At block 332, the CPU 108 resumes accessing the cache memory 144. That is, the CPU 108 resumes reading and writing the cache memory 144 and causing other devices to read and write the cache memory 144 as necessary. Flow proceeds to block 334.

At block 334, the two RAID controllers 102 resume message transfers on the communications link 118. Flow ends at block 334.

As may be observed from FIG. 3, the RAID controller 102 advantageously puts the cache memory 144 in self-refresh mode and waits for outstanding transfers to drain before changing any clock frequencies in the bus bridge/memory controller 124, and enforces that no accesses to the cache memory 144 are made while the clock frequency is being reduced, in order to ensure that no data corruption or loss occurs within the cache memory 144.

Figure 4:
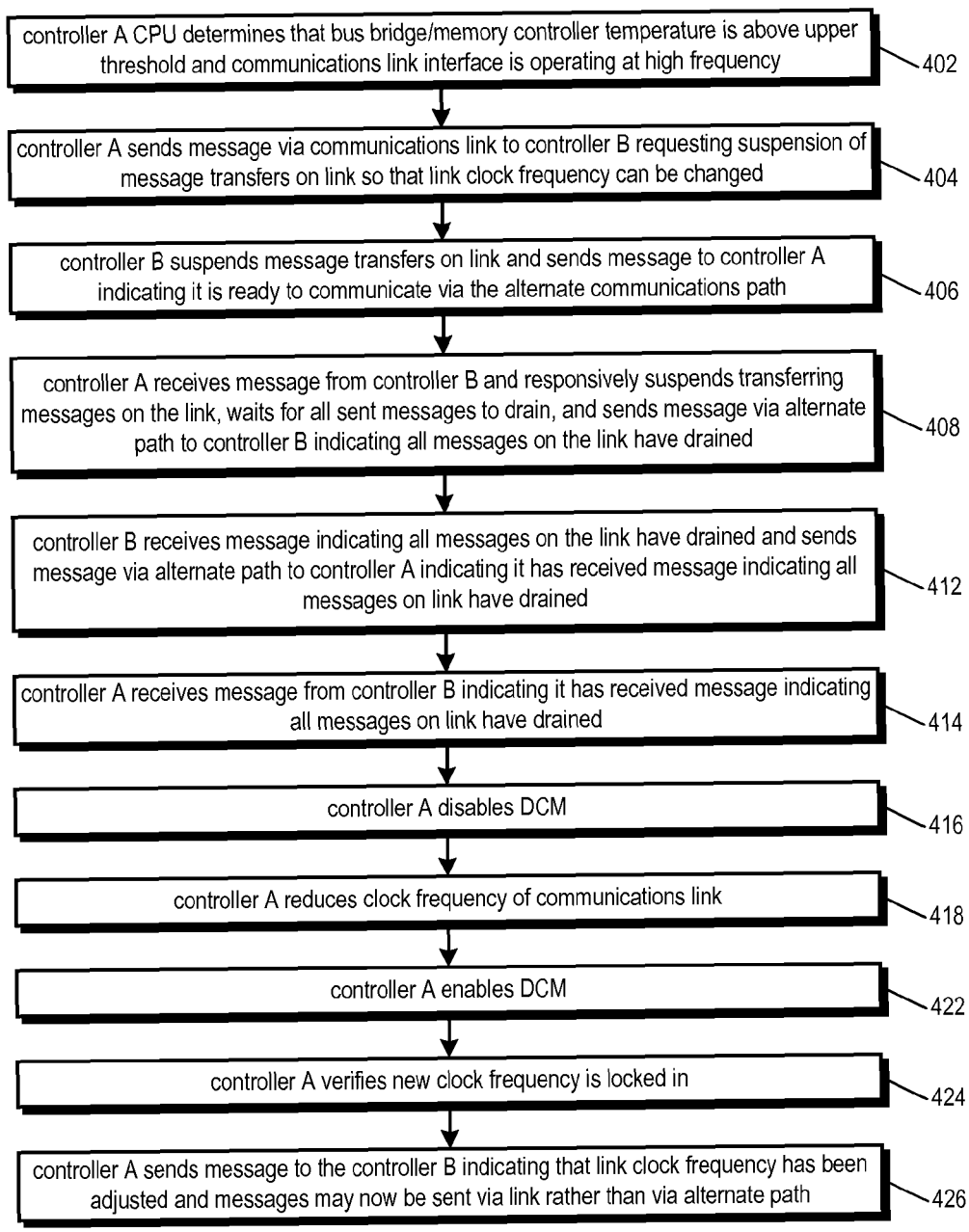
FIG. 4 is a flow diagram illustrating operation of the system of FIG. 1 to reduce the clock frequency of the link interface in order to facilitate the system remaining operational under elevated temperatures without disrupting the processing of I/O requests from the host computers and without losing or corrupting data according to the present invention.

Referring now to FIG. 4, a flow diagram illustrating operation of the system 100 of FIG. 1 to reduce the clock frequency of the link interface 182 in order to facilitate the system 100 remaining operational under elevated temperatures without disrupting the processing of I/O requests from the host computers 114 and without losing or corrupting data according to the present invention is shown. Flow begins at block 402.

At block 402, the CPU 108 of one of the RAID controllers 102, denoted controller A 102A, samples the temperatures from the temperature sensors 152 and determines that the temperature of the bus bridge/memory controller 124 is above a predetermined upper threshold and that the communications link interface 182 is operating at a high frequency, i.e., at a frequency that is higher than the lowest frequency in the set of possible frequencies that the code running on the CPU 108 is configured to set the link interface 182. The set of possible frequencies is at least two frequencies for the link interface 182; however, embodiments are contemplated in which the sets include more then two frequencies in order to allow more fine-grained frequency reduction and the accompanying effect on heat generation by the bus bridge/memory controller 124. In one embodiment, the CPU 108 determines from the bus bridge/memory controller 124 temperature sensor 152-1 that the temperature is above the predetermined threshold. In another embodiment, the CPU 108 determines from the general circuit board temperature sensor 152-3 that the temperature is above the predetermined threshold, such as in an embodiment in which the RAID controller 102 includes the circuit board temperature sensor 152-3 but does not include a distinct temperature sensor for the bus bridge/memory controller 124. That is, the determination that a frequency adjustment is required may be made in response to temperature samples of various sources. Flow proceeds to block 404.

At block 404, controller A 102A sends a message to the partner RAID controller 102, denoted controller B 102B, via the communications link 118 requesting suspension of message transfers on the communications link 118 so that the frequency of the clock on the communications link 118 may be changed. Flow proceeds to block 406.

At block 406, controller B 102B stops sending messages on the communications link 118 and sends a message to controller A 102A indicating that it is ready to communicate via an alternate communications path. In one embodiment, the path through the disk interface 128 to the disk arrays 116 is used as the alternate communications path between the storage controllers 102. For example, each storage controller 102 may appear as a SCSI target device on a SAS or FibreChannel fabric, and each controller 102 may transmit SCSI commands that include the messages to the partner controller 102 over the fabric, as described below with respect to blocks 408 to 414. Flow proceeds to block 408.

At block 408, controller A 102A receives the message from controller B 102B transmitted at block 406 and in response stops sending messages on the communications link 118, waits for all messages it has sent on the communications link 118 to drain, and then sends a message to controller B 102B via the alternate path indicating that all messages on the communications link 118 have drained. Flow proceeds to block 412.

At block 412, controller B 102B receives the message from controller A 102A transmitted at block 408 and in response sends a message via the alternate path to controller A 102A indicating it has received the message. Flow proceeds to block 414.

At block 414, controller A 102A receives the message from controller B 102B transmitted at block 412. Flow proceeds to block 416.

At block 416, in response to receiving the message at block 414, the CPU 108 of controller A 102A sets the PCI-Express DCM disable bit 282 of FIG. 2B to disable the clock signals to the PCI-Express interface 182. Flow proceeds to block 418.

At block 418, the CPU 108 of controller A 102A programs the clock generator 196 to reduce the frequency of the clock 166 generated by the clock generator 196 for the link interface 182. In one embodiment, the reduced clock frequency is a frequency at which the link interface 182 can continue to operate even at an upper operating temperature value of the NEBS criteria. Embodiments are contemplated in which the clock generation circuitry for the link interface 182 is internal to the bus bridge/memory controller 124, rather than the RAID controller 102 having a discrete clock generator 196. Flow proceeds to block 422.

At block 422, the CPU 108 of controller A 102A clears the PCI-Express DCM disable bit 282 to enable the clock signals to the PCI-Express interface 182. Flow proceeds to block 424.

At block 424, the CPU 108 of controller A 102A verifies that the new clock frequency programmed at block 418 is locked into the PLL. Flow proceeds to block 426.

At block 426, controller A 102A sends a message to controller B 102B to indicate that the communications link 118 clock frequency has been successfully lowered and that controller B 102B may now send messages to controller A 102A via the communications link 118 rather than via the alternate path. In one embodiment, the storage controllers 102 also exchange messages to indicate that all messages sent via the alternate path have drained. Flow ends at block 426.

Figure 5:
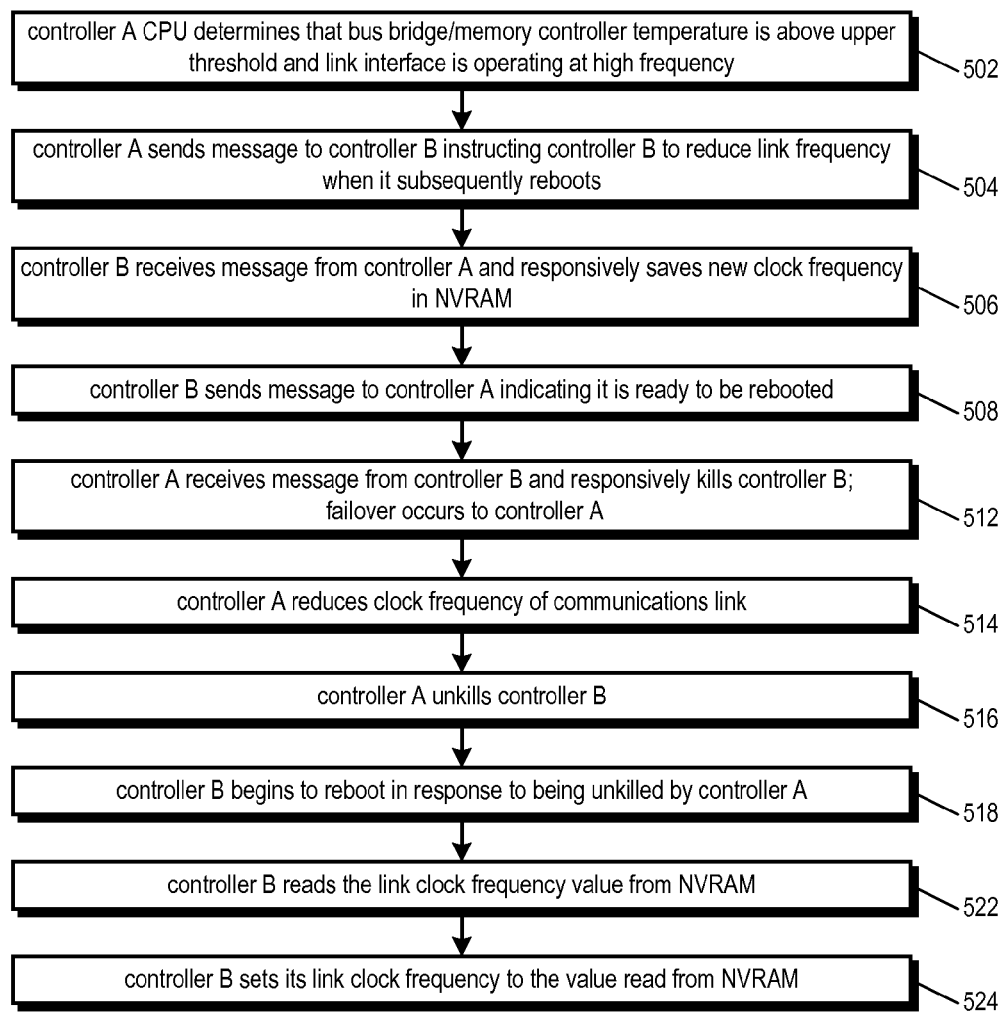
FIG. 5 is a flow diagram illustrating operation of the system of FIG. 1 to reduce the clock frequency of the link interface in order to facilitate the system remaining operational under elevated temperatures without disrupting the processing of I/O requests from the host computers and without losing or corrupting data according to an alternate embodiment of the present invention.

Referring now to FIG. 5, a flow diagram illustrating operation of the system 100 of FIG. 1 to reduce the clock frequency of the link interface 182 in order to facilitate the system 100 remaining operational under elevated temperatures without disrupting the processing of I/O requests from the host computers 114 and without losing or corrupting data according to an alternate embodiment of the present invention is shown. Flow begins at block 502.

At block 502, the CPU 108 of controller A 102A samples the temperatures from the temperature sensors 152 and determines that the temperature of the bus bridge/memory controller 124 is above a predetermined upper threshold and that the communications link interface 182 is operating at a high frequency, similar to the step at block 402 of FIG. 4. Flow proceeds to block 504.

At block 504, controller A 102A sends a message to controller B 102B via the communications link 118 instructing controller B 102B to reduce the communications link 118 frequency when controller B 102B subsequently reboots. Flow proceeds to block 506.

At block 506, controller B 102B receives the message transmitted at block 504 and in response saves the new clock frequency value, i.e., the lower desired clock frequency value, into a non-volatile memory of controller B 102B, such as the FLASH memory 162. Flow proceeds to block 508.

At block 508, controller B 102B sends a message to controller A 102A indicating it is ready to be rebooted. In one embodiment, controller B 102B flushes any cached data to the disk arrays 116 before sending the message. Flow proceeds to block 512.

At block 512, controller A 102A receives the message transmitted at block 508 and in response kills controller B 102B. The controller A 102A kills controller B 102B by putting controller B 102B in reset, which stops the clocks on the controller B 102B, which effectively stops controller B 102B from generating heat. In one embodiment, controller A 102A and controller B 102B are plugged into a common backplane or mid-plane that includes signal traces that enable each of the storage controllers 102 to generate a reset signal to put its partner controller 102 in reset. In one embodiment, the reset signals each comprise a two-wire connection that connects a complex programmable logic device (CPLD) included on each of the controllers 102. In one embodiment, the CPU 108 of the killing storage controller 102 writes to its CPLD a predetermined kill sequence of bits that are decoded by the CPLD on the partner storage controller 102. If the receiving partner storage controller 102 CPLD decodes the predetermined kill sequence, then the receiving CPLD asserts the reset signal on the partner storage controller 102 to stop all the devices on the partner storage controller 102. Conversely, the surviving storage controller 102 may subsequently transmit a predetermined unkill sequence of bits to cause the CPLD of the partner storage controller 102 to take the partner storage controller 102 out of reset. Additionally, failover from controller B 102B to controller A 102A occurs. That is, whereas controller B 102B was previously servicing I/O requests from some or all of the host computers 114, controller A 102A begins servicing all the I/O requests from the host computers 114 in the absence of controller B 102B. Flow proceeds to block 514.

At block 514, controller A 102A reduces the clock frequency of the clock 166 generated by the clock generator 196 for the link interface 182 in a manner similar to the steps described above with respect to blocks 416 through 424 of FIG. 4. Flow proceeds to block 516.

At block 516, controller A 102A unkills controller B 102B, i.e., takes controller B 102B out of reset. Flow proceeds to block 518.

At block 518, controller B 102B begins to reboot in response to being taken out of reset by controller A 102A at block 516. Flow proceeds to block 522.

At block 522, the CPU 108 of controller B 102B, in the process of rebooting, reads the new clock frequency value from the non-volatile memory that was written at block 506. Flow proceeds to block 524.

At block 524, the CPU 108 of controller B 102B sets the clock frequency of the clock 166 generated by the clock generator 196 for the link interface 182, in a manner similar to the steps described above with respect to blocks 416 through 424 of FIG. 4, to the value read at block 522. Flow ends at block 524.

The embodiment of FIG. 5 has the advantage of simplicity over the embodiment of FIG. 4. However, the simplicity is achieved at the cost of a window of time in which the system 100 is non-redundant while one RAID controller 102 is non-operational. The embodiment of FIG. 4 is more complex and has the disadvantage of requiring the alternate communication path, but has the benefit of avoiding the non-redundant window of time.

Figure 6:
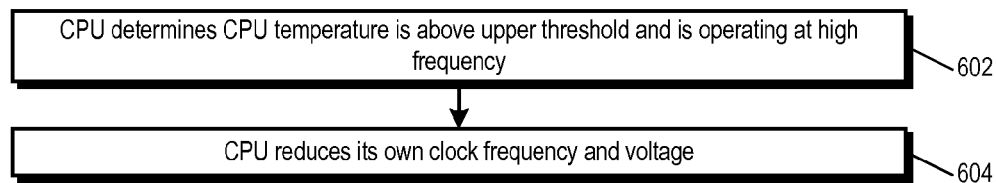
FIG. 6 is a flow diagram illustrating operation of the RAID controller of FIG. 1 to reduce the clock frequency and voltage of the CPU in order to facilitate the RAID controller remaining operational under elevated temperatures without disrupting the processing of I/O requests from the host computers and without losing or corrupting data according to the present invention.

Referring now to FIG. 6, a flow diagram illustrating operation of the RAID controller 102 of FIG. 1 to reduce the clock frequency and voltage of the CPU 108 in order to facilitate the RAID controller 102 remaining operational under elevated temperatures without disrupting the processing of I/O requests from the host computers 114 and without losing or corrupting data according to the present invention is shown. Flow begins at block 602.

At block 602, the CPU 108 samples the temperatures from the temperature sensors 152 and determines that the temperature of the CPU 108 is above a predetermined upper threshold and that the CPU 108 is operating at a high frequency, i.e., at a frequency that is higher than the lowest frequency in the set of possible frequencies that the code running on the CPU 108 is configured to set the CPU 108. The set of possible frequencies is at least two frequencies for the CPU 108; however, embodiments are contemplated in which the sets include more then two frequencies in order to allow more fine-grained frequency reduction and the accompanying effect on heat generation by the CPU 108. In one embodiment, the CPU 108 determines from the CPU 108 temperature sensor 152-2 that the temperature is above the predetermined threshold. In another embodiment, the CPU 108 determines from the general circuit board temperature sensor 152-3 that the temperature is above the predetermined threshold, such as in an embodiment in which the RAID controller 102 includes the circuit board temperature sensor 152-3 but does not include a distinct temperature sensor for the CPU 108. That is, the determination that a frequency adjustment is required may be made in response to temperature samples of various sources. Flow proceeds to block 604.

At block 604, the CPU 108 reduces its own clock frequency and voltage. In one embodiment, the reduced clock frequency is a frequency at which the CPU 108 can continue to operate even at an upper operating temperature value of the NEBS criteria. Flow ends at block 604.

Figure 7:
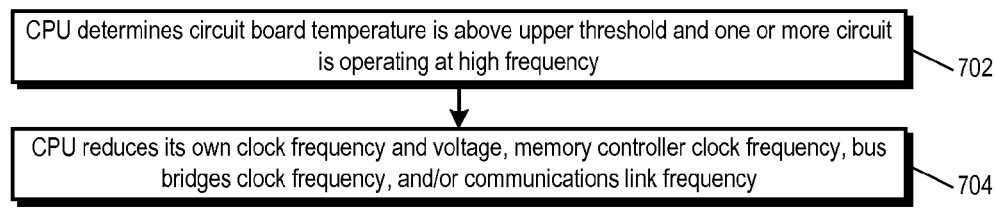
FIG. 7 is a flow diagram illustrating operation of the system of FIG. 1 to reduce the clock frequency of its various circuits in order to facilitate the system remaining operational under elevated temperatures without disrupting the processing of I/O requests from the host computers and without losing or corrupting data according to the present invention.

Referring now to FIG. 7, a flow diagram illustrating operation of the system 100 of FIG. 1 to reduce the clock frequency of its various circuits in order to facilitate the system 100 remaining operational under elevated temperatures without disrupting the processing of I/O requests from the host computers 114 and without losing or corrupting data according to the present invention is shown. Flow begins at block 702.

At block 702, the CPU 108 samples the temperature from the circuit board temperature sensor 152-3 and determines that the temperature is above a predetermined upper threshold and that the one or more of the CPU 108, memory controller 186, bus interfaces 132/136, and link interface 182 is operating at a high frequency, i.e., at a frequency that is higher than the lowest frequency in the set of possible frequencies that the code running on the CPU 108 is configured to set them. Flow proceeds to block 704.

At block 704, the CPU 108 reduces its own clock frequency and voltage (as described above with respect to FIG. 6), reduces the clock frequency of the memory controller 186 and bus interfaces 132/136 (as described above with respect to FIG. 3), or reduces the clock frequency of the link interface 182 (as described above with respect to FIG. 4 or FIG. 5), or any combination thereof. Flow ends at block 704.

Figure 8:
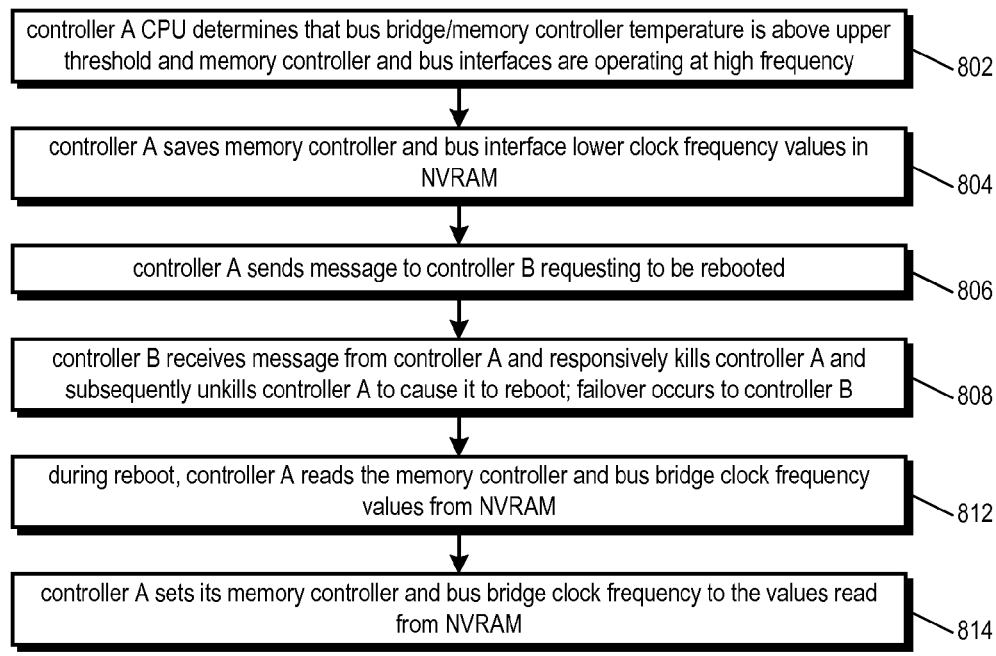
FIG. 8 is a flow diagram illustrating operation of the system of FIG. 1 to reduce the clock frequency of the memory controller and bus interfaces in order to facilitate the system remaining operational under elevated temperatures without disrupting the processing of I/O requests from the host computers and without losing or corrupting data according to an alternate embodiment of the present invention.

Referring now to FIG. 8, a flow diagram illustrating operation of the system 100 of FIG. 1 to reduce the clock frequency of the memory controller 186 and bus interfaces 132/136 in order to facilitate the system 100 remaining operational under elevated temperatures without disrupting the processing of I/O requests from the host computers 114 and without losing or corrupting data according to an alternate embodiment of the present invention is shown. The steps of FIG. 8 are similar in some respects to the steps of the embodiment of FIG. 5. Flow begins at block 802.

At block 802, the CPU 108 of controller A 102A samples the temperatures from the temperature sensors 152 and determines that the temperature of the bus bridge/memory controller 124 is above a predetermined upper threshold and that the memory controller 186 and bus interfaces 132/136 are operating at a high frequency. Flow proceeds to block 804.

At block 804, controller A 102A saves the lower clock frequency values, i.e., the lower desired clock frequency values, of the memory controller 186 and bus interfaces 132/136 into a non-volatile memory of controller A 102A. Flow proceeds to block 806.

At block 806, controller A 102A sends a message to controller B 102B requesting to be rebooted. In one embodiment, controller A 102A flushes any cached data to the disk arrays 116 before sending the message. Flow proceeds to block 808.

At block 808, controller B 102B receives the message transmitted at block 806 and in response kills controller A 102A and subsequently unkills controller A 102A to cause controller A 102A to reboot. Additionally, failover from controller A 102A to controller B 102B occurs. Flow proceeds to block 812.

At block 812, the CPU 108 of controller A 102A, in the process of rebooting, reads the new clock frequency values from the non-volatile memory that were written at block 804. Flow proceeds to block 814.

At block 814, the CPU 108 of controller A 102A sets the clock frequency of the clock 166 generated by the clock generator 196 for the memory controller 186 and bus interfaces 132/136 to the value read at block 812. Flow ends at block 814.

In alternate embodiments, rather than lower the clock frequency for both the memory controller 186 and bus interfaces 132/136, the steps of FIG. 8 may be performed to lower the clock frequency of only one of them. Furthermore, the steps of FIG. 8 may be employed to reduce the clock frequency of the CPU 108, either alone, or in combination with the memory controller 186 and/or bus interfaces 132/136.

Figure 9:
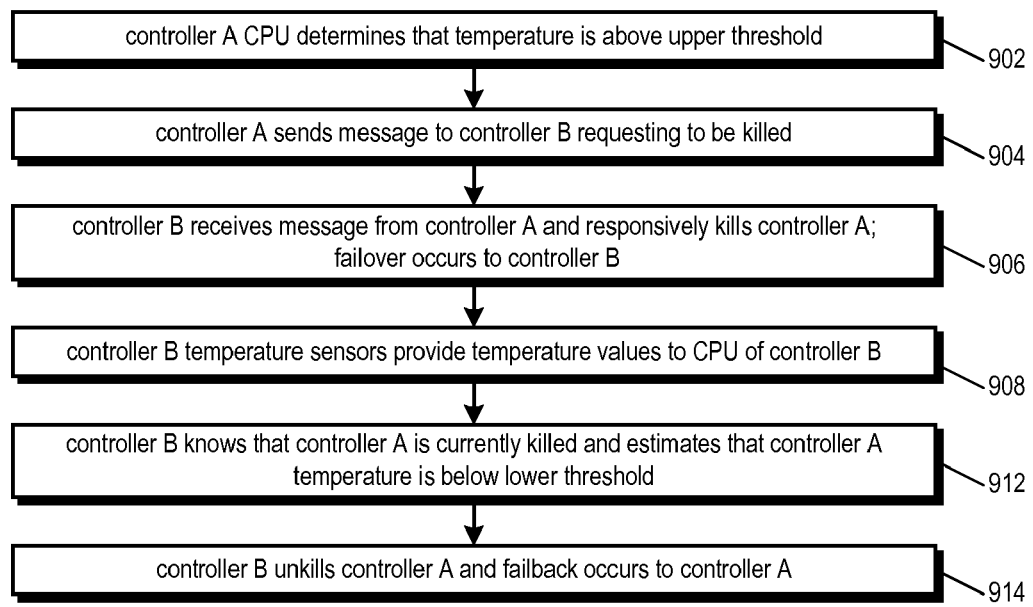
FIG. 9 is a flow diagram illustrating operation of the system of FIG. 1 to facilitate the system remaining operational under elevated temperatures without disrupting the processing of I/O requests from the host computers and without losing or corrupting data according to an alternate embodiment of the present invention.

Referring now to FIG. 9, a flow diagram illustrating operation of the system 100 of FIG. 1 to facilitate the system 100 remaining operational under elevated temperatures without disrupting the processing of I/O requests from the host computers 114 and without losing or corrupting data according to an alternate embodiment of the present invention is shown. Flow begins at block 902.

At block 902, the CPU 108 of controller A 102A samples the temperatures from the temperature sensors 152 and determines that the temperature of controller A 102A is above a predetermined upper threshold. In one embodiment, the system 100 operates according to the steps of FIG. 9 without availing itself of the opportunity to reduce the clock frequency of one or more of its circuits such as via the embodiments of FIGS. 3 through 8. However, in other embodiments, flow proceeds to block 904 only if no opportunity to reduce the temperature by reducing the clock frequency by one or more of the embodiments of FIGS. 3 through 8 is available, such as if the circuits are already operating at their lowest clock frequency, or if the CPU 108 detects that the temperature has already reached a critical temperature, or if the CPU 108 determines that the rate of temperature increase warrants proceeding directly to block 904. It is noted that in embodiments in which the system 100 first attempts to lower the clock frequency before performing the steps of FIG. 9, the one or more circuits may be operating at a lower frequency when the predetermined upper threshold is detected at block 902; consequently in these embodiments, advantageously the predetermined upper temperature threshold of block 902 may be higher than if the circuits are operating at their normal clock frequencies (i.e., without first reducing their clock frequencies) since generally the failure temperature of digital integrated circuits is higher when operating at a lower frequency than when operating at a higher frequency. Flow proceeds to block 904.

At block 904, controller A 102A sends a message to controller B 102B via the communications link 118 requesting to be killed. Flow proceeds to block 906.

At block 906, controller B 102B receives the message transmitted at block 904 and in response kills controller A 102A. Additionally, failover from controller A 102A to controller B 102B occurs. Flow proceeds to block 908.

At block 908, the CPU 108 of controller B 102B samples the temperatures from the temperature sensors 152 of controller B 102B. Flow proceeds to block 912.

At block 912, controller B 102B, knowing that it is currently holding controller A 102A in a reset state, estimates from its own temperatures sampled at block 908, the temperature of controller A 102A, and waits until the estimated temperature of controller A 102A has dropped below a predetermined lower threshold due to the fact that the clocks have not been running on controller A 102A while it is in reset. If controller A 102A and controller B 102B are in relatively close physical proximity, then the temperature sensors 152 of controller B 102B, and in particular the circuit board temperature sensor 152-3, may reasonably approximately provide the temperature of controller A 102A. Flow proceeds to block 914.

At block 914, controller B 102B unkills controller A 102A, controller A 102A boots back up, and failback to controller A 102A occurs. Flow ends at block 914.

Embodiments of FIGS. 3 through 9 are contemplated in which the CPU 108 initially determines whether any of the temperature sensors indicates a value above a warning threshold, and if so, issues a warning message to alert a system administrator of the condition. The warning message may include, but is not limited to, a message for display on an output device such as a monitor or printer, a visual indicator such as the lighting of an LED, an audio indicator such as a beep or buzzer, or notification via a digital pager or cell phone.

Furthermore, embodiments of FIGS. 4, 5, 8 and 9 are contemplated in which the storage controller 102 first determines whether its partner storage controller 102 is operational, and if not, shuts itself down rather than proceeding to the steps that request action by the partner storage controller 102. In one embodiment, the storage controller 102 shutting itself down comprises refraining from processing I/O requests received from the host computers 114; however, the storage controller 102 may continue to communicate with the partner storage controller 102 and may continue to communicate with a user via a management interface of the storage controller 102.

In addition to the embodiments of FIGS. 3 through 8 in which the clock frequency of various circuits of the RAID controller 102 is reduced in order to facilitate the system 100 remaining operational under elevated temperatures without disrupting the processing of I/O requests from the host computers 114 and without losing or corrupting data, embodiments will now be described in FIGS. 10 through 15 in which the clock frequencies of the circuits is increased again in response to determining that the relevant temperatures have dropped below predetermined thresholds. Advantageously, this enables the RAID controller 102 to provide higher performance than in the reduced clock frequency state when the RAID controller 102 cools off, due to the frequency reduction and/or due to a change in ambient conditions, such as intervention by the system operator. Many of the steps of FIGS. 10 through 15 are similar to the steps of corresponding FIGS. 3 through 8 and like steps are like numbered.

Figure 10:
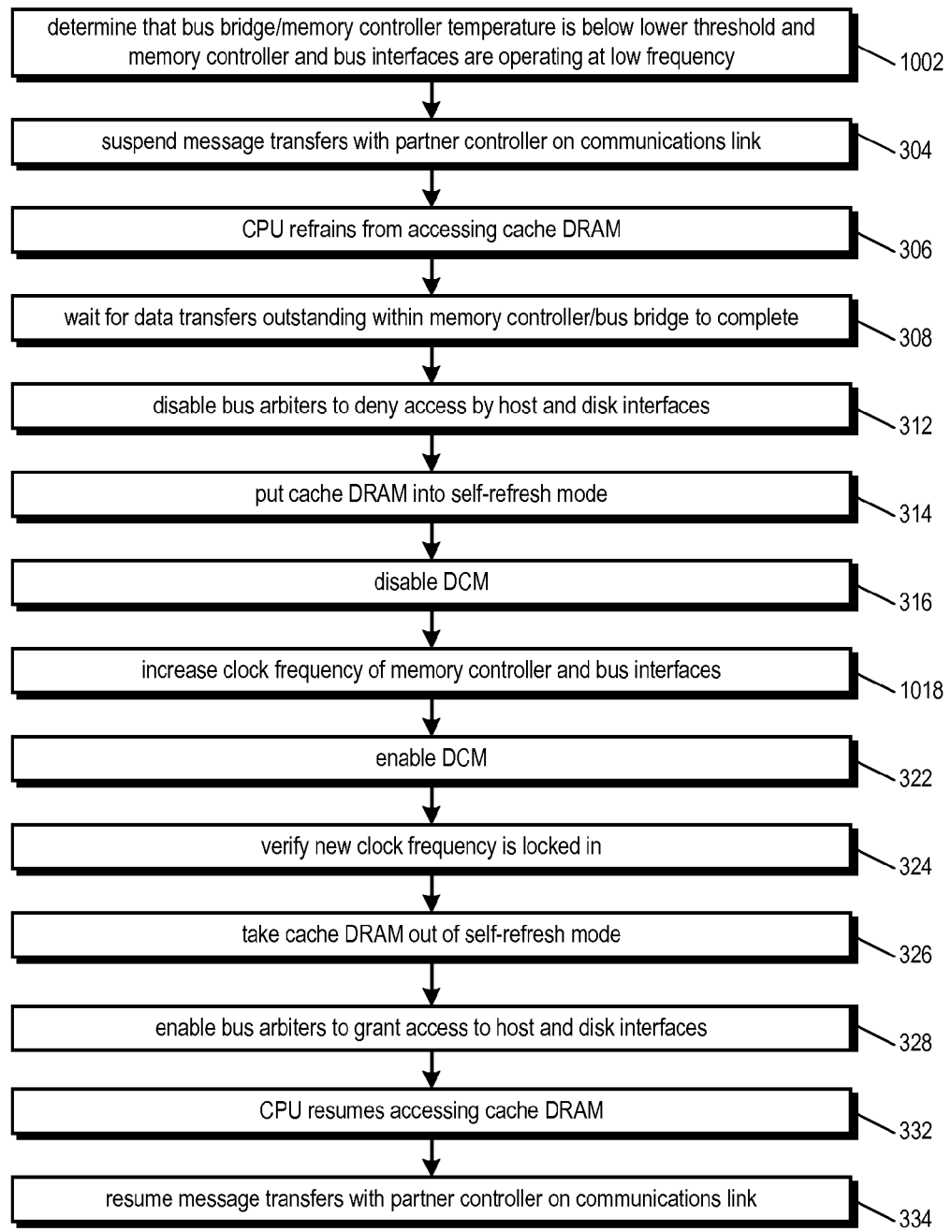
FIG. 10 is a flow diagram illustrating operation of the RAID controller of FIG. 1 to increase the clock frequency of the memory controller and/or bus interfaces without disrupting the processing of I/O requests from the host computers and without losing or corrupting data according to the present invention.

Referring now to FIG. 10, a flow diagram illustrating operation of the RAID controller 102 of FIG. 1 to increase the clock frequency of the memory controller 186 and/or bus interfaces 132/136 without disrupting the processing of I/O requests from the host computers 114 and without losing or corrupting data according to the present invention is shown. Flow begins at block 1002.

At block 1002, the CPU 108 samples the temperatures from the temperature sensors 152 and determines that the temperature of the bus bridge/memory controller 124 is below a predetermined lower threshold and that the memory controller 186 and bus interfaces 132/136 are operating at a low frequency, i.e., at a frequency that is lower than the highest frequency in the set of possible frequencies that the code running on the CPU 108 is configured to set the memory controller 186 or bus interfaces 132/136. Flow proceeds to block 304.

Blocks 304 through 316 of FIG. 10 are similar to like-numbered blocks of FIG. 3. Flow proceeds from block 316 to block 1018.

At block 1018, the CPU 108 programs the clock generator 196 to increase the frequency of the clocks 166 generated by the clock generator 196 for the memory controller 186 and the bus interfaces 132/136. In one embodiment, the CPU 108 may only increase the clock frequency of the memory controller 186 or the bus interfaces 132/136, but not both, even though the CPU 108 determines at block 302 that both are operating at a low frequency. For example, the CPU 108 may determine that the rate at which the temperature of the bus bridge/memory controller 124 is dropping is small enough that the frequency of only one of the clocks 166 can be increased without causing an undesirable heat increase. Furthermore, as discussed above, embodiments are contemplated in which the memory controller 186 and bus interfaces 132/136 are included in two or more distinct integrated circuits and thus their temperatures may be separately sampled. In such embodiments, the CPU 108 may increase the frequency of the clock 166 of the distinct circuits individually or in combination. Flow proceeds to block 322.

Blocks 322 through 334 of FIG. 10 are similar to like-numbered blocks of FIG. 3. Flow ends at block 334.

Figure 11:
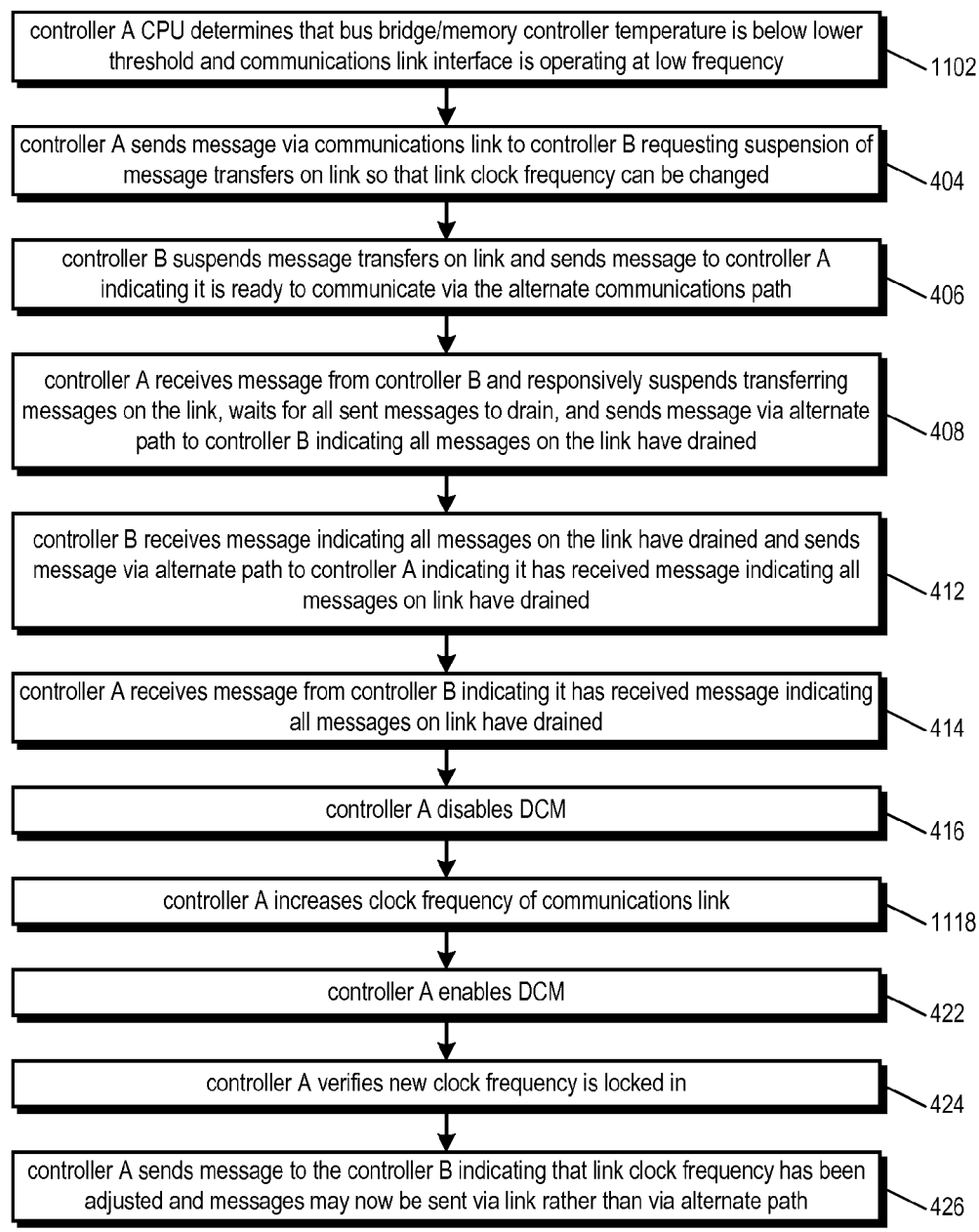
FIG. 11 is a flow diagram illustrating operation of the system of FIG. 1 to increase the clock frequency of the link interface without disrupting the processing of I/O requests from the host computers and without losing or corrupting data according to the present invention.

Referring now to FIG. 11, a flow diagram illustrating operation of the system 100 of FIG. 1 to increase the clock frequency of the link interface 182 without disrupting the processing of I/O requests from the host computers 114 and without losing or corrupting data according to the present invention is shown. Flow begins at block 1102.

At block 1102, the CPU 108 of one of the RAID controllers 102, denoted controller A 102A, samples the temperatures from the temperature sensors 152 and determines that the temperature of the bus bridge/memory controller 124 is below a predetermined lower threshold and that the communications link interface 182 is operating at a low frequency, i.e., at a frequency that is lower than the highest frequency in the set of possible frequencies that the code running on the CPU 108 is configured to set the link interface 182. Flow proceeds to block 404.

Blocks 404 through 316 of FIG. 11 are similar to like-numbered blocks of FIG. 4. Flow proceeds from block 416 to block 1118.

At block 1118, the CPU 108 of controller A 102A programs the clock generator 196 to increase the frequency of the clock 166 generated by the clock generator 196 for the link interface 182. Flow proceeds to block 422.

Blocks 422 through 426 of FIG. 11 are similar to like-numbered blocks of FIG. 4. Flow ends at block 426.

Figure 12:
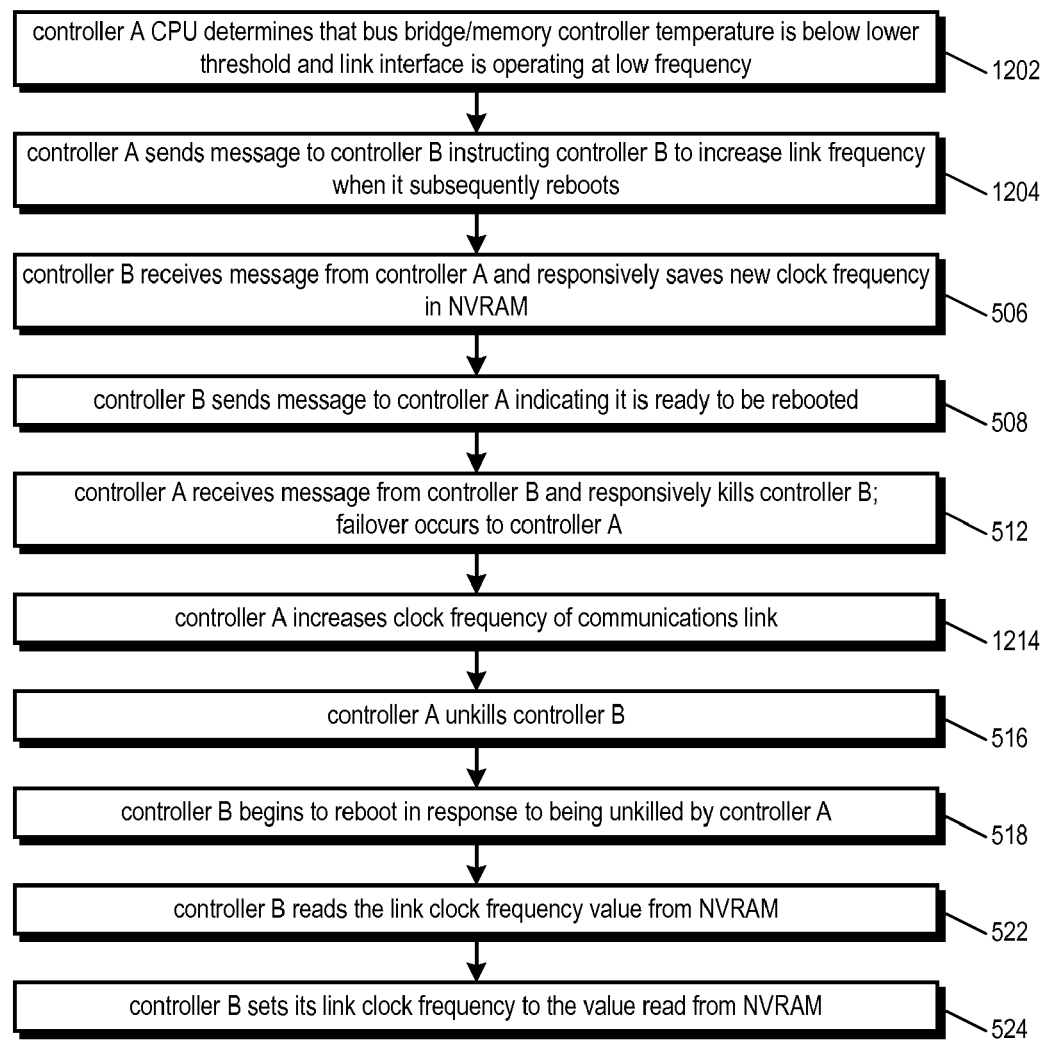
FIG. 12 is a flow diagram illustrating operation of the system of FIG. 1 to increase the clock frequency of the link interface without disrupting the processing of I/O requests from the host computers and without losing or corrupting data according to an alternate embodiment of the present invention.

Referring now to FIG. 12, a flow diagram illustrating operation of the system 100 of FIG. 1 to increase the clock frequency of the link interface 182 without disrupting the processing of I/O requests from the host computers 114 and without losing or corrupting data according to an alternate embodiment of the present invention is shown. Flow begins at block 1202.

At block 1202, the CPU 108 of controller A 102A samples the temperatures from the temperature sensors 152 and determines that the temperature of the bus bridge/memory controller 124 is below a predetermined lower threshold and that the communications link interface 182 is operating at a low frequency. Flow proceeds to block 1204.

At block 1204, controller A 102A sends a message to controller B 102B via the communications link 118 instructing controller B 102B to increase the communications link 118 frequency when controller B 102B subsequently reboots. Flow proceeds to block 506.

Blocks 506 through 512 of FIG. 12 are similar to like-numbered blocks of FIG. 5. Flow proceeds from block 512 to block 1214.

At block 1214, controller A 102A increases the clock frequency of the clock 166 generated by the clock generator 196 for the link interface 182 in a manner similar to the steps described above with respect to blocks 416 through 424 of FIG. 4, except that the frequency is increased rather than decreased. Flow proceeds to block 516.

Blocks 516 through 524 of FIG. 12 are similar to like-numbered blocks of FIG. 5. Flow ends at block 524.

Figure 13:
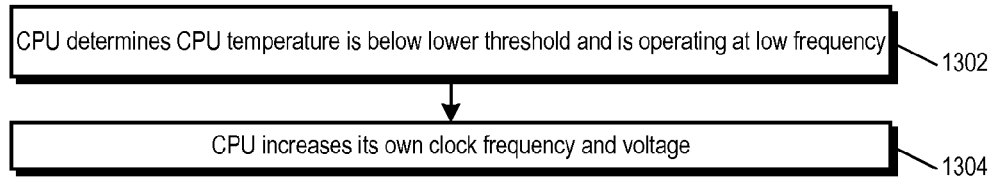
FIG. 13 is a flow diagram illustrating operation of the RAID controller of FIG. 1 to increase the clock frequency and voltage of the CPU without disrupting the processing of I/O requests from the host computers and without losing or corrupting data according to the present invention.

Referring now to FIG. 13, a flow diagram illustrating operation of the RAID controller 102 of FIG. 1 to increase the clock frequency and voltage of the CPU 108 without disrupting the processing of I/O requests from the host computers 114 and without losing or corrupting data according to the present invention is shown. Flow begins at block 1302.

At block 1302, the CPU 108 samples the temperatures from the temperature sensors 152 and determines that the temperature of the CPU 108 is below a predetermined lower threshold and that the CPU 108 is operating at a low frequency, i.e., at a frequency that is lower than the highest frequency in the set of possible frequencies that the code running on the CPU 108 is configured to set the CPU 108. Flow proceeds to block 1304.

At block 1304, the CPU 108 increases its own clock frequency and voltage. Flow ends at block 1304.

Figure 14:
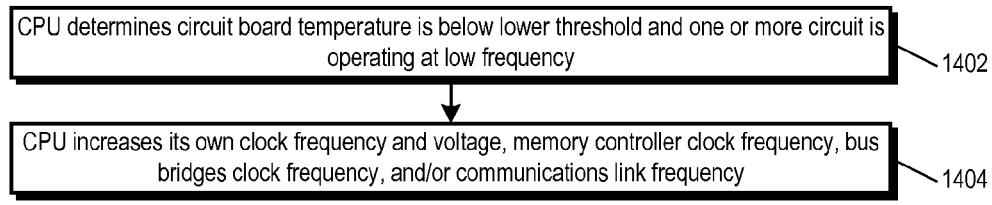
FIG. 14 is a flow diagram illustrating operation of the system of FIG. 1 to increase the clock frequency of its various circuits without disrupting the processing of I/O requests from the host computers and without losing or corrupting data according to the present invention.

Referring now to FIG. 14, a flow diagram illustrating operation of the system 100 of FIG. 1 to increase the clock frequency of its various circuits without disrupting the processing of I/O requests from the host computers 114 and without losing or corrupting data according to the present invention is shown. Flow begins at block 1402.

At block 1402, the CPU 108 samples the temperature from the circuit board temperature sensor 152-3 and determines that the temperature is below a predetermined lower threshold and that the one or more of the CPU 108, memory controller 186, bus interfaces 132/136, and link interface 182 is operating at a low frequency, i.e., at a frequency that is lower than the highest frequency in the set of possible frequencies that the code running on the CPU 108 is configured to set them. Flow proceeds to block 1404.

At block 1404, the CPU 108 increases its own clock frequency and voltage (as described above with respect to FIG. 13), increases the clock frequency of the memory controller 186 and bus interfaces 132/136 (as described above with respect to FIG. 10), or increases the clock frequency of the link interface 182 (as described above with respect to FIG. 11 or FIG. 12), or any combination thereof. Flow ends at block 1404.

Figure 15:
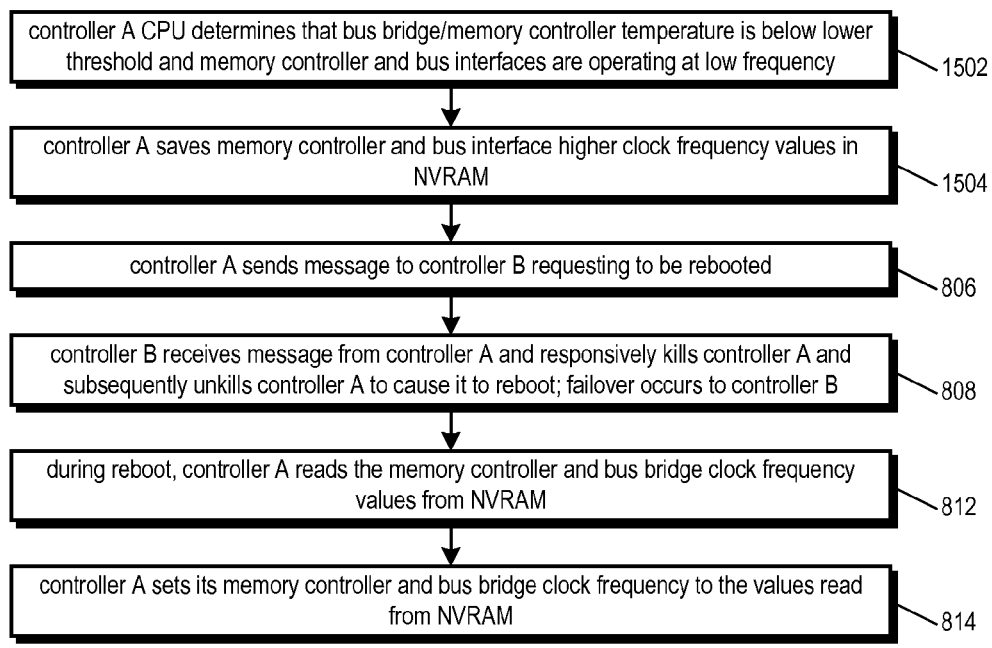
FIG. 15 is a flow diagram illustrating operation of the system of FIG. 1 to increase the clock frequency of the memory controller and bus interfaces without disrupting the processing of I/O requests from the host computers and without losing or corrupting data according to an alternate embodiment of the present invention.

Referring now to FIG. 15, a flow diagram illustrating operation of the system 100 of FIG. 1 to increase the clock frequency of the memory controller 186 and bus interfaces 132/136 without disrupting the processing of I/O requests from the host computers 114 and without losing or corrupting data according to an alternate embodiment of the present invention is shown. The steps of FIG. 15 are similar in some respects to the steps of the embodiment of FIG. 12. Flow begins at block 1502.

At block 1502, the CPU 108 of controller A 102A samples the temperatures from the temperature sensors 152 and determines that the temperature of the bus bridge/memory controller 124 is below a predetermined lower threshold and that the memory controller 186 and bus interfaces 132/136 are operating at a low frequency. Flow proceeds to block 1504.

At block 1504, controller A 102A saves the higher clock frequency values, i.e., the higher desired clock frequency values, of the memory controller 186 and bus interfaces 132/136 into a non-volatile memory of controller A 102A. Flow proceeds to block 806.

The steps at block 806 through 814 of FIG. 15 are similar to like-numbered steps of FIG. 8. Flow ends at block 814.

In alternate embodiments, rather than raise the clock frequency for both the memory controller 186 and bus interfaces 132/136, the steps of FIG. 15 may be performed to raise the clock frequency of only one of them. Furthermore, the steps of FIG. 15 may be employed to increase the clock frequency of the CPU 108, either alone, or in combination with the memory controller 186 and/or bus interfaces 132/136.

Although FIGS. 3 through 15 illustrate transitioning between only two different operating frequencies, other embodiments are contemplated in which the storage controller 102 transitions between more than two operating frequencies for one or more of the integrated circuits in order to enable operation at elevated temperatures.

Although the present invention and its objects, features, and advantages have been described in detail, other embodiments are encompassed by the invention. For example, although embodiments have been described in which the only frequency is reduced for the various integrated circuits, other embodiments are contemplated in which the voltage is also reduced, if the integrated circuit supports operation at multiple voltage levels, in order to further reduce the amount of heat generated by the integrated circuit. Additionally, although embodiments have been described in which the system includes redundant storage controllers, single, non-redundant storage controller embodiments are also contemplated that employ the operating frequency reduction methods described herein to enable a single storage controller to continue to operate at elevated temperatures, such as the embodiments of FIGS. 3, 6, 7, 10, 13 and 14.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A storage controller configured to operate under elevated temperature conditions, comprising:
   a memory, configured to buffer data transferred between host computers and storage devices connected to the storage controller;
   at least one interface controller, configured to request access to the memory;
   a memory controller, configured to control the memory; and
   a CPU, configured to execute the following steps in a non-preemptable sequence of instructions:
   detect that a temperature of the memory controller has exceeded a predetermined threshold while operating at a first frequency and voltage;
   place the memory into self-refresh mode after detecting that the temperature of the memory controller has exceeded the predetermined threshold;
   reduce the operating frequency and voltage of the memory controller to a second frequency and voltage after placing the memory into self-refresh mode, wherein the CPU forgoes aborting any requests by the at least one interface controller while the memory is in self-refresh mode;
   take the memory out of self-refresh mode after reducing the operating frequency and voltage of the memory controller to the second frequency and voltage; and
   service all outstanding requests by the at least one interface controller.

2. The storage controller of claim 1, wherein said CPU is further configured to:
   refrain from attempting to access the memory while the memory is in self-refresh mode.

3. The storage controller of claim 1, further comprising:
   a link interface circuit, coupled to the memory controller, the link interface circuit configured to couple to a communications link, wherein the storage controller is configured to communicate with a second storage controller via the communications link;
   wherein the storage controller is further configured to:
   suspend transfers of messages on the communications link between the storage controllers while the memory is in self-refresh mode.

4. The storage controller of claim 1, further comprising:
   a bridge circuit, configured to bridge the at least one interface controller to the memory controller;
   wherein the CPU is configured to control the bridge circuit to deny access to the memory by the at least one interface controller while the memory is in self-refresh mode.

5. The storage controller of claim 4, wherein the at least one interface controller comprises:
   an interface controller, configured to request to transfer data between the memory and the storage devices.

6. The storage controller of claim 4, wherein the at least one interface controller comprises:
   an interface controller, configured to request to transfer data between the memory and the host computers.

7. The storage controller of claim 1, wherein the CPU is further configured to:
   detect that the temperature of the memory controller has dropped below a second predetermined threshold while operating at the second frequency and voltage;
   place the memory into self-refresh mode after detecting that the temperature of the memory controller has dropped below the second predetermined threshold;
   increase the operating frequency and voltage of the memory controller to the first frequency and voltage after placing the memory into self-refresh mode the second time; and
   take the memory out of self-refresh mode after increasing the operating frequency and voltage of the memory controller to the first frequency and voltage.

8. The storage controller of claim 1, wherein the CPU is further configured to:
   detect that the temperature of the memory controller has exceeded a second predetermined threshold while operating at the second frequency and voltage, wherein the second predetermined threshold is above the first predetermined threshold; and
   cease operation of the storage controller after detecting that the temperature of the memory controller has exceeded the second predetermined threshold.

9. The storage controller of claim 1, further comprising:
   a temperature sensor, coupled to the memory controller, configured to sense the temperature of the memory controller and to provide the temperature to the CPU.

10. A storage controller configured to operate under elevated temperature conditions, comprising:
    a memory, configured to buffer data transferred between host computers and storage devices connected to the storage controller;
    a memory controller, configured to control the memory;
    at least one interface controller, configured to request access to the memory;
    a bridge circuit, configured to bridge the at least one interface controller to the memory controller; and
    a CPU, configured to execute the following steps in a non-preemptable sequence of instructions:
    detect that a temperature of the memory controller has exceeded a predetermined threshold while operating at a first frequency;
    control the bridge circuit to deny access to the memory by the at least one interface controller after detecting that the temperature of the memory controller has exceeded the predetermined threshold, wherein the CPU forgoes aborting any requests by the at least one interface controller while the bridge circuit denies access to the memory;
    reduce the operating frequency of the memory controller to a second frequency after denying access to the memory; and
    grant access to the memory by the at least one interface controller after reducing the operating frequency of the memory controller to the second frequency, wherein the CPU services all outstanding requests by the at least one interface controller .

11. The storage controller of claim 10, wherein the CPU is further configured to:

refrain from initiating reading from or writing to the memory while reducing the operating frequency of the memory controller to the second frequency.

12. The storage controller of claim 10, further comprising:
a link interface circuit, coupled to the memory controller, the link interface circuit configured to couple to a communications link, wherein the storage controller is configured to communicate with a second storage controller via the communications link;
wherein the storage controller is further configured to:
refrain from initiating transfers of messages on the communications link between the storage controllers prior to reducing the operating frequency of the memory controller to the second frequency.

13. The storage controller of claim 10, wherein the CPU is further configured to:
place the memory into self-refresh mode after denying access to the memory and before reducing the operating frequency of the memory controller; and
take the memory out of self-refresh mode after reducing the operating frequency of the memory controller and before granting access to the memory.

14. The storage controller of claim 10, wherein the at least one interface controller comprises:
an interface controller, configured to request to transfer data between the memory and the storage devices.

15. The storage controller of claim 10, wherein the at least one interface controller comprises:
an interface controller, configured to request to transfer data between the memory and the host computers.

16. The storage controller of claim 10, wherein the bridge circuit comprises:
a bus arbiter, configured to arbitrate requests for ownership of a local bus coupling the at least one interface controller to the bridge circuit;
wherein the CPU is configured to control the bridge circuit to deny access to the memory by disabling the bus arbiter.

17. The storage controller of claim 16, wherein the bus arbiter comprises a PCI-X bus arbiter configured to receive requests to access the memory from PCI-X devices coupled to the local bus.

18. A storage controller configured to operate under elevated temperature conditions, comprising:
an interface controller, configured to interface the storage controller to host computers;
a memory subsystem, configured to buffer data requested by the host computers, the data being received from disk drives controlled by the storage controller;
a bus bridge, configured to bridge the interface controller and the memory subsystem; and
a CPU, configured to execute the following steps in a non-preemptable sequence of instructions:
detect that a temperature of the bus bridge has exceeded a predetermined threshold while operating at a first frequency;
program the bus bridge to deny access to the memory subsystem by the interface controller in response to detecting that the temperature of the bus bridge has exceeded the predetermined threshold, wherein the CPU forgoes aborting any requests by the interface controller while the bus bridge denies access to the memory;
reduce the operating frequency of the bus bridge to a second frequency after denying access to the memory subsystem; and
grant access to the memory by the interface controller after reducing the operating frequency of the bus bridge to the second frequency, wherein the CPU services all outstanding requests by the interface controller.

19. The storage controller of claim 18, wherein the CPU is further configured to:
refrain from initiating reading from or writing to the memory subsystem while reducing the operating frequency of the bus bridge to the second frequency.

20. The storage controller of claim 18, further comprising:
a link interface circuit, coupled to the memory controller, the link interface circuit configured to couple to a communications link, wherein the storage controller is configured to communicate with a second storage controller via the communications link;
wherein the storage controller is further configured to:
refrain from initiating transfers of messages on the communications link between the storage controllers while said reducing the operating frequency of the bus bridge to the second frequency.

21. The storage controller of claim 18, wherein the CPU is further configured to:
place a memory of the memory subsystem into self-refresh mode before reducing the operating frequency of the bus bridge to the second frequency; and
take the memory out of self-refresh mode after reducing the operating frequency of the bus bridge to the second frequency.

22. The storage controller of claim 18, further comprising:
a second interface controller, coupled to the bus bridge, configured to interface the storage controller to the disk drives;
wherein the bus bridge is further configured to bridge the second interface controller and the memory subsystem;
wherein the CPU is further configured to:
deny access to the memory subsystem by the second interface controller in response to detecting that the temperature of the bus bridge has exceeded the predetermined threshold; and
grant access to the memory by the second interface controller after reducing the operating frequency of the bus bridge to the second frequency.

23. The storage controller of claim 18, wherein the bus bridge comprises:
a bus arbiter, configured to arbitrate requests for ownership of a local bus coupling the interface controller to the bus bridge;
wherein the CPU is configured to control the bus bridge to deny access to the memory by disabling the bus arbiter.

24. The storage controller of claim 23, wherein the bus arbiter comprises a PCI-X bus arbiter configured to receive requests to access the memory from PCI-X devices coupled to the local bus.

25. The storage controller of claim 18, wherein the CPU is further configured to:
wait for completion of all transfers between the memory subsystem and the bus bridge that are outstanding within the bus bridge prior to denying access to the memory subsystem and before reducing the operating frequency of the bus bridge to the second frequency.

26. A redundant storage controller system configured to operate under elevated temperature conditions, comprising:
first and second storage controllers, coupled by a serial communications link, each of the controllers having a integrated circuit configured to control communications on the link;

wherein the storage controllers are configured to:
  detect that a temperature of at least one of the integrated circuits has exceeded a predetermined threshold while operating at a first frequency and voltage;
  suspend transfers of messages on the serial communications link in response to detecting that the temperature of the at least one integrated circuit has exceeded the predetermined threshold, wherein to suspend transfers of messages on the serial communications link:
    the first storage controller is configured to transfer a message to the second storage controller on an alternate communications path than the serial communications link, the message requesting the integrated circuit of the second controller to suspend transfers of messages on the serial communications link; and
    the second storage controller is configured to suspend transfers of messages on the serial communications link by the integrated circuit in response to receiving the message on the alternate communications path from the first storage controller;
  reduce the operating frequency and voltage of the integrated circuits to a second frequency and voltage after suspending transfers of messages on the serial communications link; and
  resume transfers of messages on the serial communications link after reducing the operating frequency and voltage of the integrated circuits to the second frequency and voltage.

27. The system of claim 26, wherein the serial communications link comprises a PCI-Express link.

28. The system of claim 26, wherein the serial communications link comprises a SAS link.

29. The system of claim 26, wherein the serial communications link comprises a FibreChannel link.

30. The system of claim 26, wherein each of the storage controllers comprises a CPU configured to detect the temperature has exceeded the threshold and reduce the operating frequency and voltage of the respective integrated circuit.

31. The system of claim 26, wherein said alternate communications path comprises a communications path used by the first and second storage controllers to communicate with disk drives controlled by the storage controllers.

32. The system of claim 26, wherein the alternate communications path comprises a FibreChannel path.

33. The system of claim 26, wherein the alternate communications path comprises a serial attached SCSI (SAS) path.

34. A redundant storage controller system configured to operate under elevated temperature conditions, comprising:
  first and second storage controllers, each configured to control disk drives coupled thereto and to service I/O requests from hosts for data on the disk drives;
  wherein the storage controllers are configured to:
    detect that a temperature of the first storage controller has exceeded a predetermined threshold while operating at least a portion of the first storage controller at a first frequency and voltage;
    save a frequency value to a non-volatile memory of the first storage controller in response to detecting that the temperature of the first storage controller has exceeded the predetermined threshold, wherein the frequency value is a second frequency;
    fail over from the first storage controller to the second storage controller to service the host I/O requests after detecting that the temperature of the first storage controller has exceeded the predetermined threshold;
    reboot the first storage controller;
    operate the portion of the first storage controller at the frequency read from the non-volatile memory in response to rebooting; and
    fail back to the first storage controller to service at least a portion of the host I/O requests after reducing the operating frequency of the portion of the first storage controller to the second frequency.

35. The system of claim 34, wherein the portion of the first storage controller comprises a memory controller circuit configured to control a memory for buffering the data transferred between the hosts and the disk drives.

36. The system of claim 34, wherein the portion of the first storage controller comprises a CPU.

37. The system of claim 34, wherein the portion of the first storage controller comprises a serial communications link controller circuit configured to transfer messages on a serial communications link from the first storage controller to the second storage controller.

38. The system of claim 34, wherein the portion of the first storage controller comprises a bus bridge circuit configured to bridge a first bus for coupling to a first interface controller configured to interface to the disk drives and a second bus for coupling to a second interface controller configured to interface to the hosts.

39. The system of claim 34, wherein the portion of the first storage controller comprises a bus bridge circuit configured to bridge a first bus for coupling to an interface controller configured to interface to the disk drives and a second bus for coupling to a memory configured to buffer data transferred between the hosts and the disk drives.

40. The system of claim 34, wherein the portion of the first storage controller comprises a bus bridge circuit configured to bridge a first bus for coupling to an interface controller configured to interface to the disk drives and a second bus for coupling to a CPU.

41. The system of claim 34, wherein the storage controllers are further configured to:
  detect that the temperature of the first storage controller has exceeded a second predetermined threshold while operating the portion of the first storage controller at the second frequency, wherein the second predetermined threshold is above the first predetermined threshold; and
  cease operation of at least the portion of the first storage controller, in response to detecting that the temperature of the first storage controller has exceeded the second predetermined threshold.

42. The system of claim 41, wherein the first storage controller is configured to cease operation of at least the portion of the first storage controller by disabling a clock signal to the portion of the first storage controller.

43. The system of claim 41, wherein the first storage controller is configured to cease operation of at least the portion of the first storage controller by holding in reset the portion of the first storage controller.

44. A method for allowing a storage controller to operate under elevated temperature conditions, the storage controller having a memory for buffering data transferred between host computers and storage devices connected to the storage controller, the storage controller further having a memory controller configured to control the memory, the storage controller having an interface controller configured to request access to the memory, the method comprising a CPU configured to execute the following steps in a non-preemptable sequence of instructions:

detecting that a temperature of the memory controller has exceeded a predetermined threshold while operating at a first frequency and voltage;

placing the memory into self-refresh mode, in response to said detecting that the temperature of the memory controller has exceeded the predetermined threshold;

reducing the operating frequency and voltage of the memory controller to a second frequency and voltage, after said placing the memory into self-refresh mode, wherein the CPU forgoes aborting any requests by the interface controller while the memory is in self-refresh mode;

taking the memory out of self-refresh mode, after said reducing the operating frequency and voltage of the memory controller to the second frequency and voltage; and servicing all outstanding requests by the interface controller.

45. The method of claim 44, further comprising:

refraining from attempting to access the memory, while the memory is in self-refresh mode, wherein said refraining is performed by a CPU of the storage controller.

46. The method of claim 44, wherein the storage controller is configured to communicate with a second storage controller via a communications link coupling the storage controllers, the method further comprising:

suspending transfers of messages on the communications link between the storage controllers, while the memory is in self-refresh mode.

47. The method of claim 44, further comprising:

denying access to the memory by one or more requestors requesting access thereto, while the memory is in self-refresh mode.

48. The method of claim 47, wherein said denying access to the memory by the one or more requestors requesting access thereto comprises:

denying access to an interface controller requesting to transfer data between the memory and the storage devices.

49. The method of claim 44, further comprising:

detecting that the temperature of the memory controller has dropped below a second predetermined threshold while operating at the second frequency and voltage;

placing the memory into self-refresh mode, in response to said detecting that the temperature of the memory controller has dropped below the second predetermined threshold;

increasing the operating frequency and voltage of the memory controller to the first frequency and voltage, after said placing the memory into self-refresh mode the second time; and taking the memory out of self-refresh mode, after said increasing the operating frequency and voltage of the memory controller to the first frequency and voltage.

50. The method of claim 44, further comprising:

detecting that the temperature of the memory controller has exceeded a second predetermined threshold while operating at the second frequency and voltage, wherein said second predetermined threshold is above said first predetermined threshold; and ceasing operation of the storage controller, in response to said detecting that the temperature of the memory controller has exceeded the second predetermined threshold.

51. A method for allowing a storage controller to operate under elevated temperature conditions, the storage controller having a memory for buffering data transferred between host computers and storage devices connected to the storage controller, the storage controller further having a memory controller configured to control the memory, the storage controller having an interface controller configured to receive and process requests from one or more requesters for access to the memory, the method comprising a CPU configured to execute the following steps in a non-preemptable sequence of instructions:

detecting that a temperature of the memory controller has exceeded a predetermined threshold while operating at a first frequency;

denying access to the memory by the one or more requestors requesting access thereto, in response to said detecting that the temperature of the memory controller has exceeded the predetermined threshold, wherein the storage controller forgoes aborting all requests from the one or more requestors while access to the memory is denied;

reducing the operating frequency of the memory controller to a second frequency, after said denying access to the memory; and granting access to the memory by the one or more requestors, after said reducing the operating frequency of the memory controller to the second frequency, wherein the interface controller services all outstanding requests by the one or more requesters.

52. The method of claim 51, further comprising:

refraining from initiating reading from or writing to the memory, while said reducing the operating frequency of the memory controller to the second frequency, wherein said refraining is performed by a CPU of the storage controller.

53. The method of claim 51, wherein a redundant storage system comprises the first storage controller and a second storage controller, wherein the first and second storage controllers are configured to communicate via a communications link coupling the first and second storage controllers, the method further comprising:

refraining from initiating transfers of messages on the communications link between the controllers, while said reducing the operating frequency of the memory controller to the second frequency.

54. The method of claim 51, further comprising:

placing the memory into self-refresh mode, after said denying access to the memory and before said reducing the operating frequency of the memory controller; and taking the memory out of self-refresh mode, after said reducing the operating frequency of the memory controller and before said granting access to the memory.

55. The method of claim 51, wherein said denying access to the memory by the one or more requestors requesting access thereto comprises:

denying access to an interface controller requesting to transfer data between the memory and the storage devices.

56. The method of claim 51, wherein said denying access to the memory by the one or more requestors requesting access thereto comprises:

denying access to an interface controller requesting to transfer data between the memory and the host computers.

57. A method for allowing a storage controller to operate under elevated temperature conditions, the storage controller having a bus bridge configured to bridge an interface controller and a memory subsystem, the interface controller configured to interface the storage controller to host computers, the memory subsystem configured to buffer data requested by the host computers, the method comprising a CPU configured to execute the following steps in a non-preemptable sequence of instructions:

detecting that a temperature of the bus bridge has exceeded a predetermined threshold while operating at a first frequency and voltage;
 denying access to the memory subsystem by the interface controller, in response to said detecting that the temperature of the bus bridge has exceeded the predetermined threshold;
 reducing the operating frequency and voltage of the bus bridge to a second frequency and voltage, after said denying access to the memory subsystem;
 refraining from initiating reading from or writing to the memory subsystem, while said reducing the operating frequency and voltage of the bus bridge to the second frequency and voltage, wherein said refraining is performed by a CPU of the storage controller; and
 granting access to the memory by the interface controller, after said reducing the operating frequency and voltage of the bus bridge to the second frequency and voltage,
 wherein a redundant storage system comprises the first storage controller and a second storage controller, wherein the first and second storage controllers are configured to communicate via a communications link coupling the first and second storage controllers, the method further comprising:
 suspending transfers of messages on the communications link between the controllers, while said reducing the operating frequency and voltage of the bus bridge to the second frequency and voltage.

58. The method of claim 57, further comprising:
 placing a memory of the memory subsystem into self-refresh mode, before said reducing the operating frequency of the bus bridge to the second frequency; and
 taking the memory out of self-refresh mode, after said reducing the operating frequency of the bus bridge to the second frequency.

59. The method of claim 57, wherein the bus bridge is further configured to bridge a second interface controller and the memory subsystem, the second interface controller configured to interface the storage controller to disk drives, the memory subsystem configured to buffer data received from the disk drives, the method further comprising:
 denying access to the memory subsystem by the second interface controller, in response to said detecting that the temperature of the bus bridge has exceeded the predetermined threshold; and
 granting access to the memory by the second interface controller, after said reducing the operating frequency and voltage of the bus bridge to the second frequency and voltage.

60. A method for allowing a redundant storage controller system to operate under elevated temperature conditions, the system having first and second storage controllers coupled by a serial communications link, each of the controllers having a integrated circuit configured to control communications on the link, the method comprising:
 detecting that a temperature of the integrated circuit of the first storage controller has exceeded a predetermined threshold while operating at a first frequency and voltage;
 suspending transfers of messages on the serial communications link between the controllers, in response to said detecting that the temperature of the integrated circuit has exceeded the predetermined threshold, wherein said suspending transfers of messages on the serial communications link comprises:
  transferring a message from the first storage controller to the second storage controller on an alternate communications path than the serial communications link, the message requesting the integrated circuit of the second controller to suspend transfers of messages on the serial communications link; and
  suspending transfers of messages on the serial communications link by the integrated circuit of the second storage controller, in response to receiving the message on the alternate communications path;
 reducing the operating frequency and voltage of the integrated circuits to a second frequency and voltage, after said suspending transfers of messages on the serial communications link; and
 resuming transfers of messages on the serial communications link between the controllers, after said reducing the operating frequency and voltage of the integrated circuits to the second frequency and voltage.

61. The method of claim 60, wherein the serial communications link comprises a PCI-Express link.

62. The method of claim 60, wherein the serial communications link comprises a SAS link.

63. The method of claim 60, wherein the serial communications link comprises a FibreChannel link.

64. The method of claim 60, wherein said reducing the operating frequency of the integrated circuits to a second frequency comprises:
 reducing the operating frequency of the integrated circuit of the second storage controller to the second frequency, in response to said receiving the message on the alternate communications path.

65. The method of claim 60, wherein said alternate communications path comprises a communications path used by the first and second storage controllers to communicate with disk drives.

66. A method for allowing a redundant storage controller system to operate under elevated temperature conditions, the system having first and second storage controllers each configured to control disk drives coupled thereto and to service I/O requests from hosts for data on the disk drives, the method comprising:
 detecting that a temperature of the first storage controller has exceeded a predetermined threshold while operating at least a portion of the first storage controller at a first frequency and voltage;
 saving a frequency value to a non-volatile memory of the first storage controller, in response to said detecting that the temperature of the first storage controller has exceeded the predetermined threshold, wherein the frequency value is a second frequency;
 failing over from the first storage controller to the second storage controller to service the host I/O requests, after said detecting that the temperature of the first storage controller has exceeded the predetermined threshold;
 rebooting the first storage controller;
 operating the portion of the first storage controller at the frequency read from the non-volatile memory, in response to said rebooting; and
 failing back to the first storage controller to service at least a portion of the host I/O requests, after said reducing the operating frequency of the portion of the first storage controller to the second frequency.

67. The method of claim 66, wherein the portion of the first storage controller comprises a memory controller circuit configured to control a memory for buffering the data transferred between the hosts and the disk drives.

68. The method of claim 66, wherein the portion of the first storage controller comprises a CPU.

69. The method of claim 66, wherein the portion of the first storage controller comprises a serial communications link controller circuit configured to transfer messages on the serial communications link from the first storage controller to the second storage controller.

70. The method of claim 66, wherein the portion of the first storage controller comprises a bus bridge circuit configured to bridge a first bus for coupling to a first interface controller configured to interface to the disk drives and a second bus for coupling to a second interface controller configured to interface to the hosts.

71. The method of claim 66, wherein the portion of the first storage controller comprises a bus bridge circuit configured to bridge a first bus for coupling to an interface controller configured to interface to the disk drives and a second bus for coupling to a memory configured to buffer data transferred between the hosts and the disk drives.

72. The method of claim 66, wherein the portion of the first storage controller comprises a bus bridge circuit configured to bridge a first bus for coupling to an interface controller configured to interface to the disk drives and a second bus for coupling to a CPU.

73. The method of claim 66, further comprising:
   detecting that the temperature of the first storage controller has exceeded a second predetermined threshold while operating the portion of the first storage controller at the second frequency, wherein the second predetermined threshold is above the first predetermined threshold; and
   ceasing operation of at least the portion of the first storage controller, in response to said detecting that the temperature of the first storage controller has exceeded the second predetermined threshold.

74. The method of claim 73, wherein said ceasing operation of at least the portion of the first storage controller comprises disabling a clock signal to the portion of the first storage controller.

75. The method of claim 73, wherein said ceasing operation of at least the portion of the first storage controller comprises holding in reset the portion of the first storage controller.

76. A redundant storage controller system configured to operate under elevated temperature conditions, comprising:
   first and second storage controllers, coupled by a serial communications link, each of the controllers having a integrated circuit configured to control communications on the link;
   wherein the storage controllers are configured to:
      detect that a temperature of at least one of the integrated circuits has exceeded a predetermined threshold while operating at a first frequency and voltage;
      suspend transfers of messages on the serial communications link in response to detecting that the temperature of the at least one integrated circuit has exceeded the predetermined threshold;
      reduce the operating frequency and voltage of the integrated circuits to a second frequency and voltage after suspending transfers of messages on the serial communications link; and
      resume transfers of messages on the serial communications link after reducing the operating frequency and voltage of the integrated circuits to the second frequency and voltage;
   wherein the first storage controller is configured to save a frequency value to a non-volatile memory of the first storage controller in response to detecting that the temperature of the integrated circuit of the first storage controller has exceeded the predetermined threshold, wherein the frequency value is the second frequency;
   wherein to suspend transfers of messages on the serial communications link, the second storage controller is configured to reboot the first storage controller.

77. The system of claim 76, wherein to reduce the operating frequency of the integrated circuits to the second frequency, the first storage controller is configured to:
   read the frequency value from the non-volatile memory after rebooting; and
   operate the integrated circuit of the first storage controller at the frequency value read from the non-volatile memory.

78. The system of claim 76, wherein the first controller is further configured to:
   send a message on the serial communications link to the second storage controller in response to detecting that the temperature of the integrated circuit of the first storage controller has exceeded the predetermined threshold, the message indicating that the temperature of the integrated circuit of the first storage controller has exceeded the predetermined threshold;
   wherein the second controller reboots the first storage controller after receiving the message from the first controller.

79. The system of claim 78, wherein the second storage controller is configured to reboot the first storage controller by resetting the first storage controller via signals on a backplane into which the first and second storage controllers are plugged.

80. The system of claim 78, wherein the second storage controller is configured to reboot the first storage controller by sending a second message to the first storage controller in response to receiving the message from the first storage controller, wherein the first storage controller is configured to reboot itself in response to receiving the message from the second storage controller.

81. A method for allowing a redundant storage controller system to operate under elevated temperature conditions, the system having first and second storage controllers coupled by a serial communications link, each of the controllers having a integrated circuit configured to control communications on the link, the method comprising:
   detecting that a temperature of the integrated circuit of the first storage controller has exceeded a predetermined threshold while operating at a first frequency and voltage;
   saving a frequency value to a non-volatile memory of the first storage controller, in response to said detecting that the temperature of the integrated circuit of the first storage controller has exceeded the predetermined threshold, wherein the frequency value is a second frequency;
   suspending transfers of messages on the serial communications link between the controllers, in response to said detecting that the temperature of the integrated circuit has exceeded the predetermined threshold, wherein said suspending transfers of messages on the serial communications link comprises rebooting the first storage controller;

reducing the operating frequency of the integrated circuits to the second frequency, after said suspending transfers of messages on the serial communications link; and resuming transfers of messages on the serial communications link between the controllers, after said reducing the operating frequency of the integrated circuits to the second frequency.

82. The method of claim 81, wherein said reducing the operating frequency of the integrated circuits to the second frequency comprises:

reading the frequency value from the non-volatile memory, in response to said rebooting the first storage controller; and operating the integrated circuit of the first storage controller at the frequency value read from the non-volatile memory.

83. The method of claim 81, further comprising:

sending a message on the serial communications link from the first storage controller to the second storage controller, in response to said detecting that the temperature of the integrated circuit of the first storage controller has exceeded the predetermined threshold, the message indicating that the temperature of the integrated circuit of the first storage controller has exceeded the predetermined threshold;

wherein said rebooting the first storage controller is performed after said sending the message.

84. The method of claim 83, further comprising:

causing said rebooting the first storage controller, in response to receiving said message from the first storage controller, wherein said second storage controller performs said causing said rebooting the first controller.

85. The method of claim 84, wherein said causing said rebooting the first storage controller comprises:

resetting the first storage controller, in response to receiving said message from the first storage controller, wherein said second storage controller performs said resetting the first controller.

86. The method of claim 85, wherein said second storage controller performs said resetting the first controller via signals on a backplane into which the first and second storage controllers are plugged.

87. The method of claim 84, wherein said causing said rebooting the first storage controller comprises:

sending a second message from the second storage controller to the first storage controller, in response to receiving said first message from the first storage controller, wherein the first storage controller reboots itself in response to the second message.

* * * * *